(12) United States Patent
Lee et al.

(10) Patent No.: US 7,576,940 B2
(45) Date of Patent: *Aug. 18, 2009

(54) METHOD AND APPARATUS FOR ESTIMATING MICRO-ACTUATOR STROKE SENSITIVITY IN A HARD DISK DRIVE

(75) Inventors: Dong Jun Lee, Sunnyvale, CA (US);
Young-Hoon Kim, Cupertino, CA (US);
Vinod Sharma, Los Gatos, CA (US);
Hyung Jai Lee, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 5 days.

This patent is subject to a terminal disclaimer.

(21) Appl. No.: 11/329,724

(22) Filed: Jan. 10, 2006

(65) Prior Publication Data
US 2006/0114598 A1    Jun. 1, 2006

Related U.S. Application Data

(63) Continuation-in-part of application No. 10/886,171, filed on Jul. 6, 2004, now Pat. No. 7,009,803.

(51) Int. Cl.
*G11B 5/596* (2006.01)

(52) U.S. Cl. .................................. 360/77.02

(58) Field of Classification Search ............... None
See application file for complete search history.

(56) References Cited

U.S. PATENT DOCUMENTS

| 6,088,187 | A  | * | 7/2000  | Takaishi ............... 360/78.05 |
| 6,101,058 | A  | * | 8/2000  | Morris ................... 360/69 |
| 6,437,937 | B1 |   | 8/2002  | Guo et al. |
| 6,567,230 | B1 | * | 5/2003  | Kagami et al. .......... 360/75 |
| 6,741,417 | B2 | * | 5/2004  | Hsin et al. ............. 360/78.05 |
| 6,975,477 | B1 | * | 12/2005 | Hu et al. ............... 360/71 |
| 2004/0125488 | A1 |  | 7/2004  | Zhu et al. |

* cited by examiner

*Primary Examiner*—K. Wong
(74) *Attorney, Agent, or Firm*—Earle Jennings; GSS Law Group

(57) ABSTRACT

Method of estimating the stroke sensitivity of micro-actuator coupled with slider and its read-write head. Micro-actuator stimulus signal used to drive micro-actuator, inducing noise into lateral positioning of read-write head near track by voice coil motor to create PES. Lateral position noise derived from Position Error Signal. Stroke sensitivity estimated from lateral position noise and micro-actuator stimulus signal. Apparatus supporting method estimating stroke sensitivity: servo controller, embedded circuit including servo-controller, and hard disk drive may include servo-controller and/or embedded circuit. Method making servo-controller, embedded circuit, and/or hard disk drive. Servo-controller, embedded circuit, and hard disk drive are products of these processes.

30 Claims, 14 Drawing Sheets

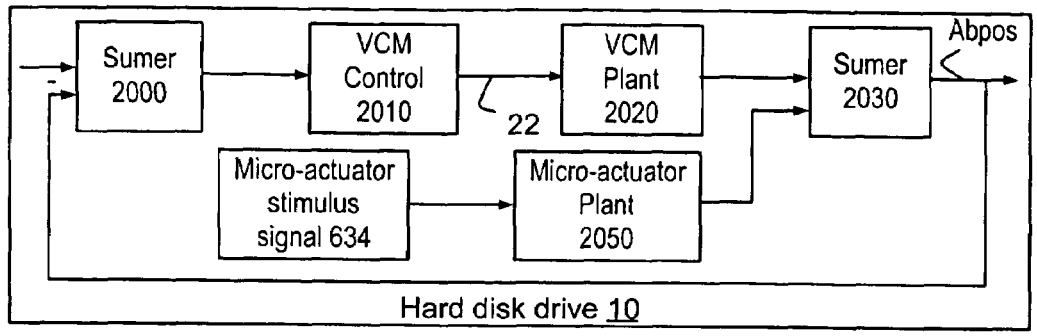
Fig. 7A
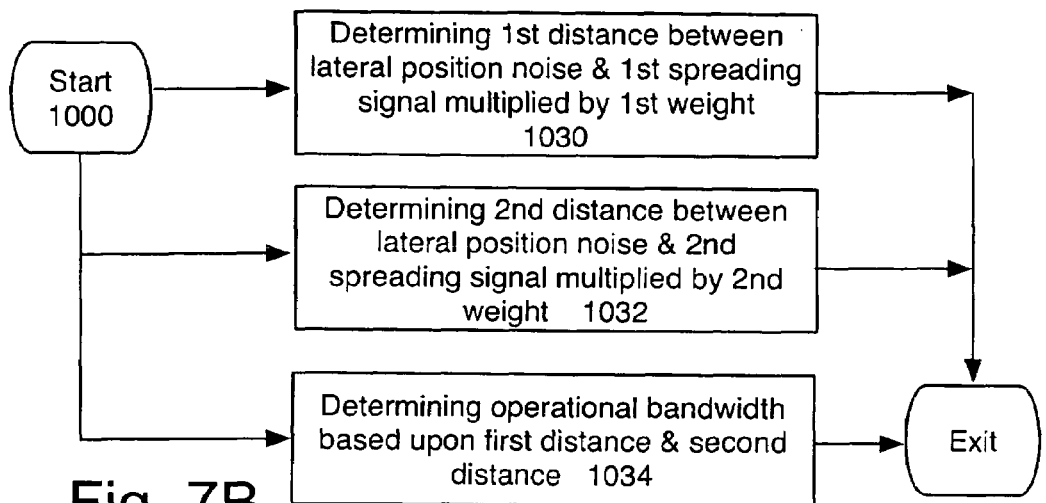
Fig. 7B
Fig. 7C
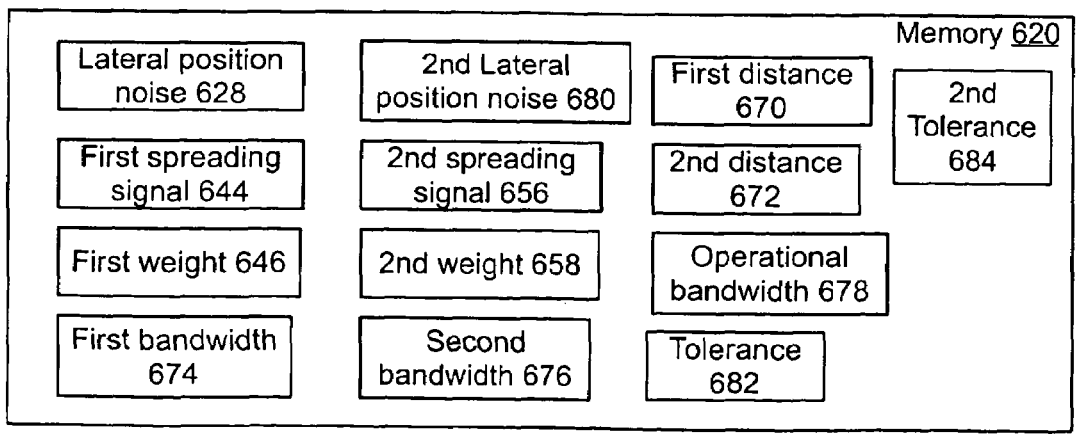

METHOD AND APPARATUS FOR ESTIMATING MICRO-ACTUATOR STROKE SENSITIVITY IN A HARD DISK DRIVE

CROSS REFERENCES TO RELATED APPLICATIONS

This application is a continuation in part of U.S. application Ser. No. 10/886,171, filed Jul. 6, 2004, now U.S. Pat. No. 7,009,803 the specification of which is hereby incorporated by referenced in its entirety.

TECHNICAL FIELD

This invention relates to hard disk drives, in particular, to methods and apparatus estimating the stroke sensitivity of a micro-actuator inside a hard disk drive, and operating the hard disk drive based upon that stroke sensitivity estimate.

BACKGROUND OF THE INVENTION

Contemporary hard disk drives include an actuator assembly pivoting through an actuator pivot to position one or more read-write heads, embedded in sliders, each over a rotating disk surface. The data stored on the rotating disk surface is typically arranged in concentric tracks. To access the data of a track, a servo controller first positions the read-write head by electrically stimulating the voice coil motor, which couples through the voice coil and an actuator arm to move a head gimbal assembly in positioning the slider close to the track. Once the read-write head is close to the track, the servo controller typically enters an operational mode known herein as track following. It is during track following mode that the read-write head is used to access data stored in the track.

Micro-actuators provide a second actuation stage for positioning the read-write head during track following mode. They often use an electrostatic effect and/or a piezoelectric effect to rapidly make fine position changes. They have doubled the bandwidth of servo controllers and are believed essential for high capacity hard disk drives from hereon.

Using micro-actuator requires an accurate stroke sensitivity estimate. The stroke sensitivity is the displacement of the read-write head in the lateral plane for a given electrical stimulus. There are several difficulties associated with achieving this. The stroke sensitivity often needs to be measured on an individual basis, inside the assembled hard disk drive, during access operations. The stroke sensitivity measurements may need to be repeated as the hard disk drive ages and may differ for each of the micro-actuators and their coupled read-write heads.

There is also a question as to whether and how much a specific micro-actuator is aiding the track following process. One useful estimate of its contribution would be an effective estimate of its operational bandwidth, over which there is close to flat frequency response.

Finally, there is the need to calibrate each specific micro-actuator as to the details of its dynamics, including mode peaks, possibly related to air flow turbulence or other sources of mechanical vibration affecting the micro-actuator.

SUMMARY OF THE INVENTION

The invention includes a method of estimating the stroke sensitivity of a micro-actuator coupled with a slider and its read-write head. A micro-actuator stimulus signal is used to drive the micro-actuator, inducing noise into the lateral positioning of the read-write head near a track by the voice coil motor to create the Position Error Signal (PES). The lateral position noise is derived from the Position Error Signal. The stroke sensitivity is estimated based upon the lateral position noise and upon the micro-actuator stimulus signal.

Estimating the stroke sensitivity can be refined by generating the micro-actuator stimulus signal with a first amplitude at a first frequency. Similarly, the micro-actuator stimulus signal may be generated with the first amplitude at a second frequency. The stroke sensitivity may be estimated based upon the stroke sensitivity at the first frequency and upon the stroke sensitivity at the second frequency.

Using the micro-actuator stimulus signal may include amplifying a first spreading signal by a first weight to create the micro-actuator stimulus signal. Using the micro-actuator stimulus signal may further include amplifying a second spreading signal by a second weight to create the micro-actuator stimulus signal.

The bandwidth of the first spreading signal may be contained in the bandwidth of the second spreading signal, and the method may include determining an operational bandwidth for the micro-actuator based upon a first distance for the bandwidth of the first spreading signal and based upon a second distance for the bandwidth of the second spreading signal.

The invention includes apparatus supporting the methods of estimating stroke sensitivity. A servo-controller may include a servo computer accessibly coupled to a memory and directed by a program system including program steps residing in the memory.

The program system may include the following. Using the micro-actuator stimulus signal driving the micro-actuator to induce noise into the lateral positioning of the read-write head near the track by the voice coil motor to create the Position Error Signal. Deriving the lateral position noise from the Position Error Signal. And estimating the stroke sensitivity based upon the lateral position noise and upon the micro-actuator stimulus signal. The program system may further include controlling the voice coil motor to laterally position the read-write head near the track on the rotating disk surface.

Alternatively, the servo-controller may include the following. A means for using the micro-actuator stimulus signal driving the micro-actuator to induce noise into the lateral positioning of the read-write head near the track by the voice coil motor to create the Position Error Signal. A means for deriving the lateral position noise from the Position Error Signal. And a means for estimating the stroke sensitivity based upon the lateral position noise and upon the micro-actuator stimulus signal. The servo-controller may further include a means for controlling the voice coil motor to laterally position the read-write head near the track on the rotating disk surface.

In certain aspects of the invention, an embedded circuit may include the servo-controller. A hard disk drive may include the servo-controller, and possibly the embedded circuit, coupled to the voice coil motor, to provide the micro-actuator stimulus signal driving the micro-actuator, and a read differential signal pair from the read-write head to the servo-controller to generate the Position Error Signal.

The invention includes making the servo-controller, possibly the embedded circuit, as well as the hard disk drive. The servo-controller, the embedded circuit, and the hard disk drive are products of these processes.

The invention includes a method of operating the micro-actuator using the stroke sensitivity. This includes controlling the micro-actuator directing the read-write head toward the track using the stroke sensitivity to create the micro-actuator stimulus signal. The micro-actuator may be further controlled using the stroke sensitivity and based upon the Position Error Signal to create the micro-actuator stimulus signal. A servo-controller may support the method of operating the micro-actuator. The servo controller may include the servo computer accessibly coupled to the memory as before, but directed by a second program system including program steps residing in the memory.

In certain embodiments, the method of estimating may be used to create the stroke sensitivity during the initialization/calibration phase of manufacturing the hard disk drive. This stage often occurs after the hard disk drive is assembled. The method estimates the stroke sensitivity for at least one micro-actuator, and if the hard disk drive includes more than one micro-actuator, may preferably perform the estimate for each of the micro-actuators.

In certain embodiments, the method of estimating may be implemented as the program system with its program steps residing in a volatile memory component of the memory, the stroke sensitivity estimate or estimates are the product of this manufacturing process, which are usually stored in a non-volatile memory component of the memory.

Alternatively, the program system may be implemented with its program steps residing in a non-volatile memory component of the memory. These embodiments are useful in estimate the stroke sensitivity throughout the life of the hard disk drive.

BRIEF DESCRIPTION OF THE DRAWINGS

FIGS. 7A to 8B show some further details of the method of estimation;

DETAILED DESCRIPTION

This invention relates to hard disk drives, in particular, to methods and apparatus estimating the stroke sensitivity of a micro-actuator inside a hard disk drive, and operating the hard disk drive based upon that stroke sensitivity estimate.

The invention includes a method of estimating the stroke sensitivity of a micro-actuator coupled with a slider and its read-write head.

Figure 1:
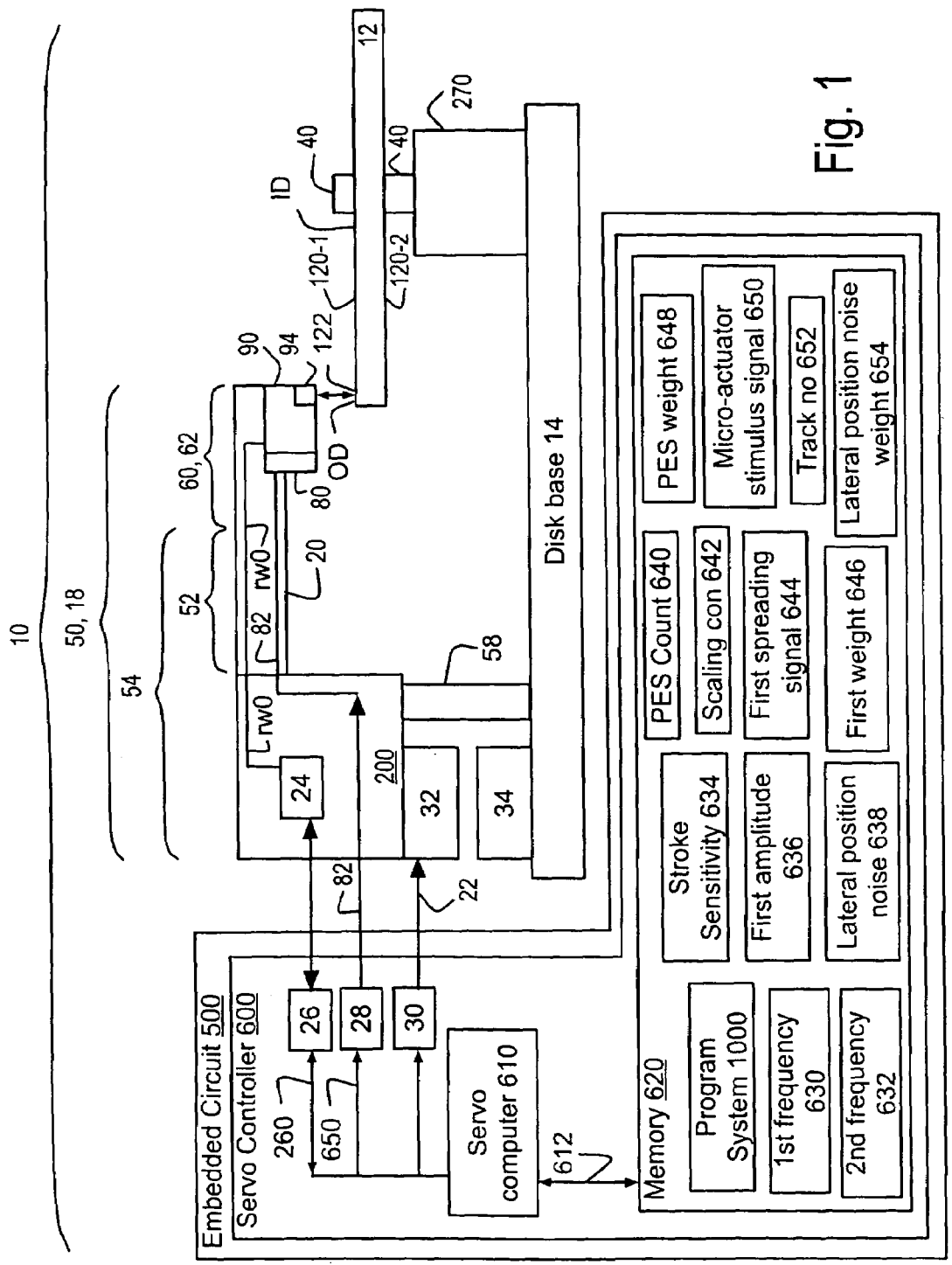
FIGS. 1 and 2 show simplified schematics of hard disk drives implementing the invention's method of estimation.
Figure 2:
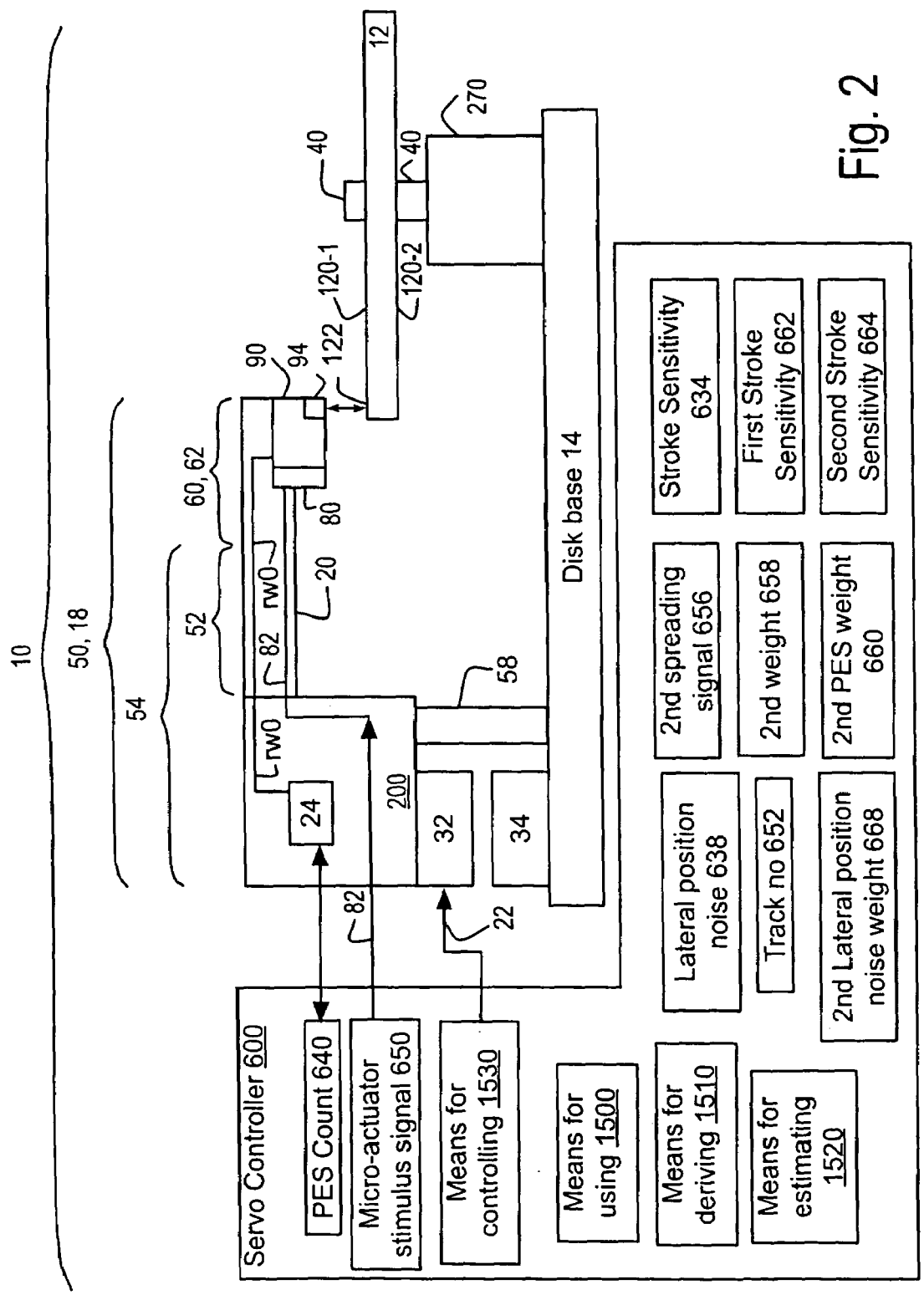

FIGS. 1 and 2 show examples of this method used within a hard disk drive 10 to estimate the stroke sensitivity 634 of a micro-actuator 80 coupled with a slider 90 and its read-write head 94. A micro-actuator stimulus signal 650 is used 1500 to drive the micro-actuator, inducing noise into the lateral positioning of the read-write head near a track 122 by the voice coil motor 18 to create the Position Error Signal 260 (PES). The lateral position noise 638 is derived 1510 from the Position Error Signal, which is often represented by a PES Count 640. The stroke sensitivity is estimated 1520 based upon the lateral position noise and upon the micro-actuator stimulus signal. Both examples show the method implemented within a servo-controller 600. FIG. 1 shows the servo-controller included in an embedded circuit 500, which is preferred in certain embodiments. The embedded circuit may preferably be implemented with a printed circuit technology.

FIGS. 1 and 2 point out some of the variations in implementation of the method for estimating the stroke sensitivity 634. The servo controller 600, as shown in FIG. 1, may include a servo computer 610 accessibly coupled 612 to a memory 620. A program system 1000 may direct the servo computer, and include program steps residing in the memory.

Alternatively, the servo-controller 600, as shown in FIG. 2, may include a means for using 1500 the micro-actuator stimulus signal 650 driving the micro-actuator 80 to induce noise into the lateral positioning of the read-write head 94 near the track 122 by the voice coil motor 18 to create the Position Error Signal 260, means for deriving 1510 the lateral position noise 638 from the Position Error Signal, and means for estimating 1520 the stroke sensitivity 634 based upon the lateral position noise and upon the micro-actuator stimulus signal. The servo-controller may further preferably include the means for controlling 1530 the voice coil motor to laterally position the read-write head near the track on the rotating disk surface 120-1.

At least one member of the means group may include at least one of a computer accessibly coupled to a memory and directed by a program system including at least one program step residing in the memory, a finite state machine, and an Application Specific Integrated Circuit (ASIC). The means group consists of the means for controlling 1530, the means for using 1500, the means for deriving 1510, and the means for estimating 1520.

Figure 3A:
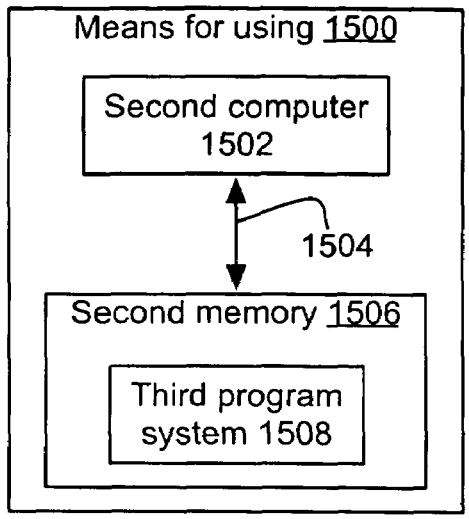
FIGS. 3A to 5F shows various implementation details related to FIGS. 1 and 2.
Figure 3B:
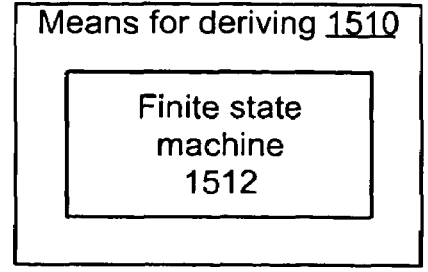
Figure 3C:
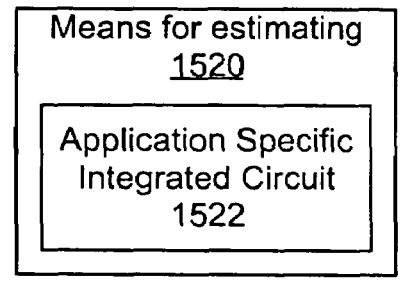

Examples of these embodiments are shown in FIGS. 3A to 3C. The means for using 1500 is shown including a second computer 1502 second accessibly coupled 1504 a second memory 1506, which includes program steps of a third program system 1508. The means for deriving 1510 includes a finite state machine 1512. The means for estimating 1520 is shown an Application Specific Integrated Circuit 1522.

Figure 3D:
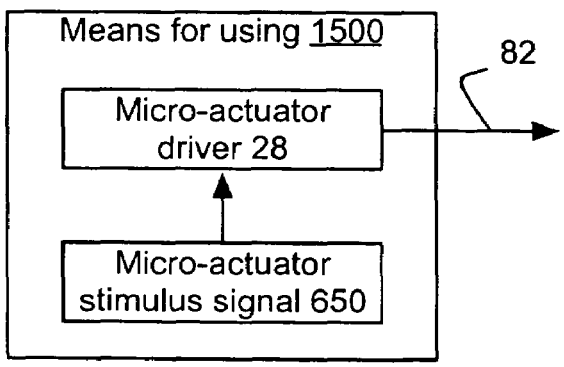

FIG. 3D shows the means for using 1500 the micro-actuator stimulus signal, may include the micro-actuator stimulus signal 650 driving a micro-actuator driver 28 providing a lateral control signal 82 to the micro-actuator 80 similarly to the example shown in FIG. 1, where the micro-actuator may respond to the lateral control signal to induce the noise into the lateral positioning of the read-write head 94 near the track 122 by the voice coil motor 18.

Figure 3E:
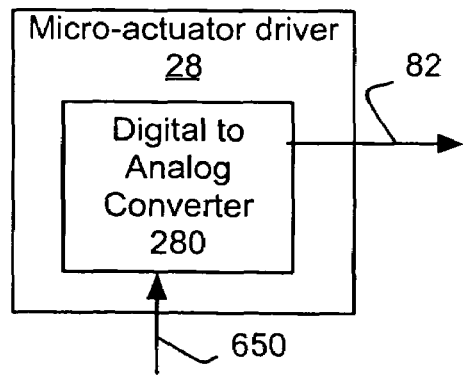
Figure 3F:
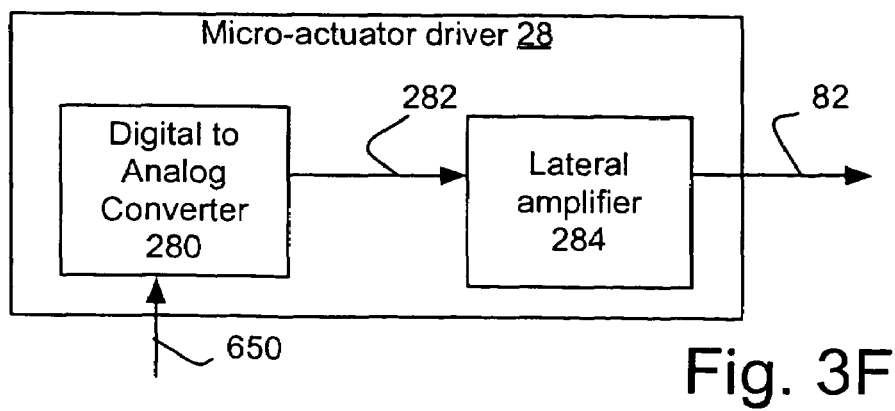

FIGS. 3E to 3F show some details of examples of the micro-actuator driver 28 of FIGS. 1 and 3D. The micro-actuator driver may include a digital to analog converter 280 contributing to the lateral control signal 82. The micro-actuator driver may further include the digital to analog converter providing its DAC output 282 to a lateral amplifier 284 to further contribute to the lateral control signal.

In various embodiments, the micro-actuator stimulus signal 650 may drive the micro-actuator driver 28 providing the lateral control signal 82 to the micro-actuator 80. The micro-actuator may respond to the lateral control signal to induce the noise into the lateral positioning of the read-write head 94 near the track 122 by the voice coil motor 18.

In more detail, the micro-actuator stimulus signal 650 driving the micro-actuator driver 28 may include the micro-actuator stimulus signal feeding a digital to analog converter providing a first micro-actuator driving signal contributing to the lateral control signal. The micro-actuator stimulus signal driving the micro-actuator driver may further include the micro-actuator stimulus signal feeding a digital to analog converter providing a first micro-actuator driving signal contributing to the lateral control signal.

Further, the micro-actuator stimulus signal 650 feeding the digital to analog converter may include the first micro-actuator driving signal presented to a first amplifier providing a first amplified signal further contributing to the lateral control signal. The first amplifier providing the first amplified signal may include the first amplified signal presented to a first filter to provide the lateral control signal.

Alternatively, the micro-actuator stimulus signal 650 driving the micro-actuator driver 28 may include the first micro-actuator driving signal presented to a second filter providing a second filtered signal further contributing to the lateral control signal. The second filter providing a second filtered signal may include the second filtered signal presented to a second amplifier providing the lateral control signal.

A computer as used herein may include at least one instruction processor and at least one data processor, where each of the data processors is directed by at least one of the instruction processors.

While the method for estimating the stroke sensitivity may be implemented with more than one computer, and that computer may be specialized to implementing just a part of the process, the method will be discussed from hereon in terms of a single servo computer as shown in FIG. 1.

The following Figures include flowcharts of at least one method of the invention possessing arrows. These arrows will signify of flow of control and sometimes data, supporting implementations including at least one program step or program thread executing upon a computer, inferential links in an inferential engine, state transitions in a finite state machine, and learned responses within a neural network.

The step of starting a flowchart refers to at least one of the following and is denoted by an oval with the text "Start" in it. Entering a subroutine in a macro-instruction sequence in a computer. Entering into a deeper node of an inferential graph. Directing a state transition in a finite state machine, possibly while pushing a return state. And triggering at least one neuron in a neural network.

The step of termination in a flowchart refers to at least one of the following and is denoted by an oval with the text "Exit" in it. The completion of those steps, which may result in a subroutine return, traversal of a higher node in an inferential graph, popping of a previously stored state in a finite state machine, return to dormancy of the firing neurons of the neural network.

A step in a flowchart refers to at least one of the following. The instruction processor responds to the step as a program step to control the data execution unit in at least partly implementing the step. The inferential engine responds to the step as nodes and transitions within an inferential graph based upon and modifying a inference database in at least partly implementing the step. The neural network responds to the step as stimulus in at least partly implementing the step. The finite state machine responds to the step as at least one member of a finite state collection comprising a state and a state transition, implementing at least part of the step.

Several flowcharts include multiple steps. In certain aspects, any one of the steps may be found in an embodiment of the invention. In other aspects, multiple steps are needed in an embodiment of the invention. When multiple steps are needed, these steps may be performed concurrently, sequentially and/or in a combination of concurrent and sequential operations. The shapes of the arrows in multiple step flowcharts may differ from one flowchart to another, and are not to be construed as having intrinsic meaning in interpreting the concurrency of the steps.

Figure 4A:
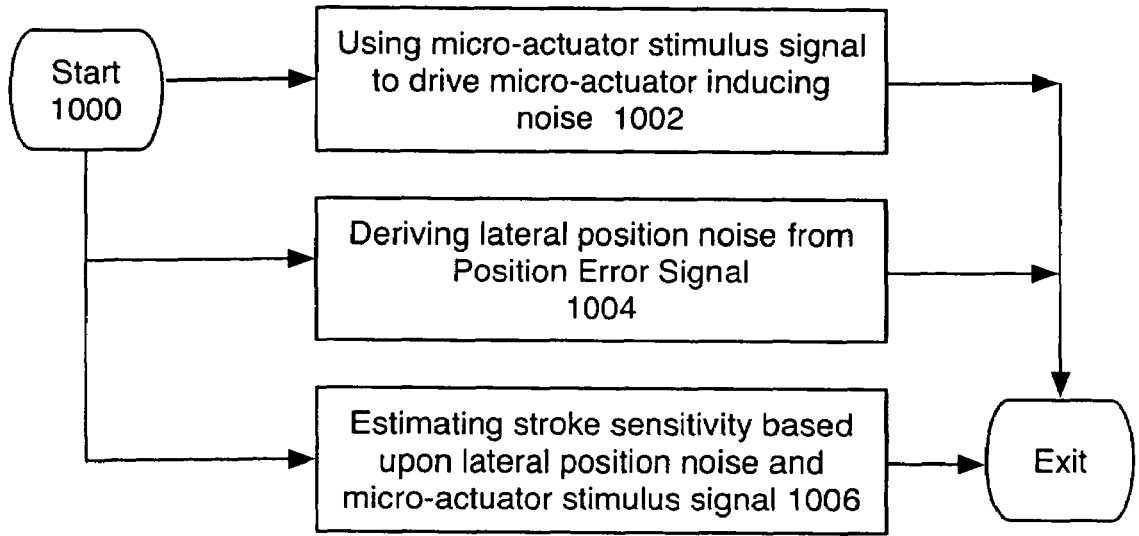

The method may be implemented by the program system 1000 shown in FIG. 1 and refined in FIG. 4A. Operation 1002 supports using 500 the micro-actuator stimulus signal 650 to drive the micro-actuator 80, inducing noise into the lateral positioning of the read-write head 94 near a track 122 by the voice coil motor 18 to create the Position Error Signal 260. Operation 1004 supports deriving 1510 the lateral position noise 638 from the Position Error Signal 260, which is often represented by a PES Count 640. Operation 1006 supports estimating 1520 the stroke sensitivity 634 based upon the lateral position noise and upon the micro-actuator stimulus signal.

Figure 4B:
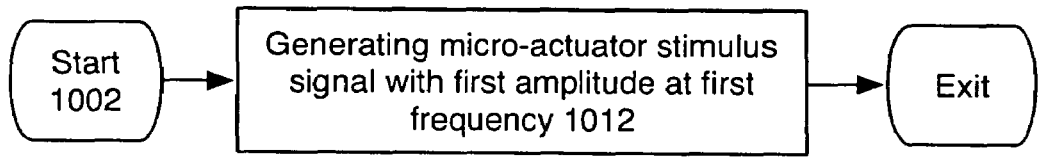
Figure 4C:
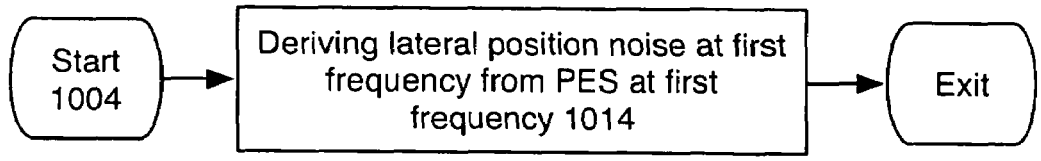
Figure 4D:
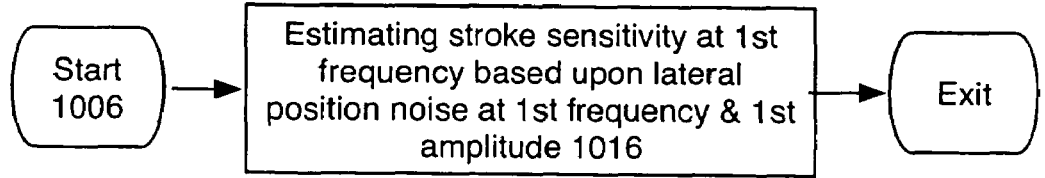

The method estimating the stroke sensitivity of FIG. 4A may be refined as shown in FIGS. 4B to 4D. Using the micro-actuator stimulus signal as shown in Operation 1002 may include Operation 1012 generating the micro-actuator stimulus signal 650 with a first amplitude 636 at a first frequency 630. Deriving the lateral position noise of Operation 1004 may include Operation 1014 supporting deriving the lateral position noise 638 at the first frequency from the Position Error Signal 260 at the first frequency. Estimating the stroke sensitivity of Operation 1006 may include Operation 1016 supporting estimating the stroke sensitivity 634 at the first frequency based upon the lateral position noise at the first frequency and upon the first amplitude.

Figure 5A:
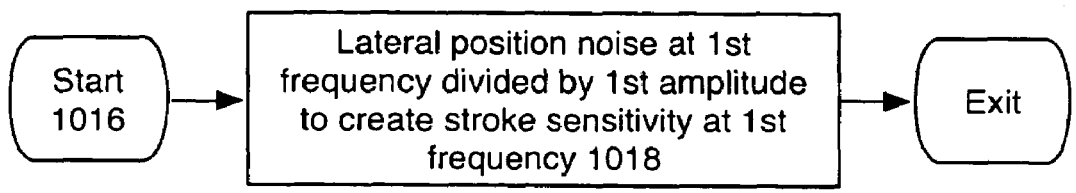
Figure 5B:
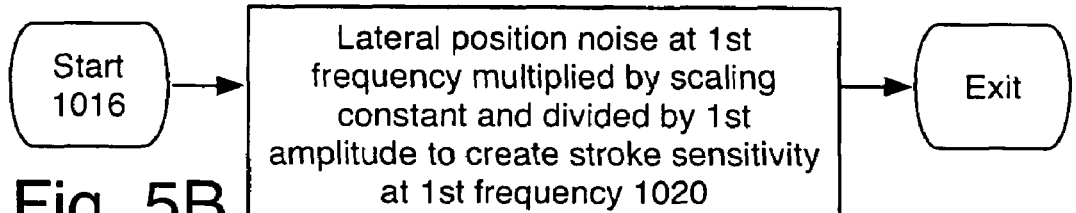

Estimating the stroke sensitivity of Operation 1016 may further include Operation 1018 of FIG. 5A supporting the lateral position noise 638 at the first frequency 630 divided by the first amplitude 636 to create the stroke sensitivity 634 at the first frequency. Further, the lateral position noise at the first frequency may be multiplied by a scaling constant 642, and divided by the first amplitude, to further create the stroke sensitivity at the first frequency, as supported by Operation 1020 of FIG. 5B.

Similarly, the micro-actuator stimulus signal 650 may be generated with the first amplitude 636 at a second frequency 632. A lateral position noise 638 at the second frequency may be derived from the Position Error Signal 260 at the second frequency. The stroke sensitivity 634 at the second frequency may be estimated based upon the lateral position noise at the second frequency and upon the first amplitude.

The stroke sensitivity 634 may be estimated based upon the stroke sensitivity at the first frequency 630 and upon the stroke sensitivity at the second frequency 632. This estimation may include, but is not limited to, the following. Averaging the stroke sensitivity at the first frequency and the stroke sensitivity at the second frequency to create the stroke sensitivity. Or, weighted-averaging the stroke sensitivity at the first frequency and the stroke sensitivity at the second frequency to create the stroke sensitivity.

In certain embodiments, a spread spectrum approach may be used to implement the method of estimating shown in FIG. 4A. Operation 1002 using 1500 the micro-actuator stimulus signal 650 may include Operation 1022 of FIG. 5C supporting amplifying a first spreading signal 644 by a first weight 646 to create the micro-actuator stimulus signal 650. Operation 1004 deriving 1510 the lateral position noise 638 may include Operation 1024 of FIG. 5D supporting demodulating the Position Error Signal 260 by the first spreading signal to create a PES weight 648 and generating a lateral position noise weight 654 from the PES weight. Operation 1006 estimating the stroke sensitivity may include Operation 1026 of FIG. 5E supporting estimating the stroke sensitivity 634 based upon the lateral position noise weight and upon the first weight.

Similarly to FIGS. 4C and 4D, estimating 1520 the stroke sensitivity 634 may include the lateral position noise weight 654 divided by the first weight 646 to create the stroke sensitivity. Estimating may further include the lateral position noise weight, multiplied by a scaling constant 642, and divided by the first weight to create the stroke sensitivity. The scaling constant used in this example based upon amplifying the spreading signal may differ from the scaling constant used with the example based upon the first frequency and the first amplitude.

Figure 5C:
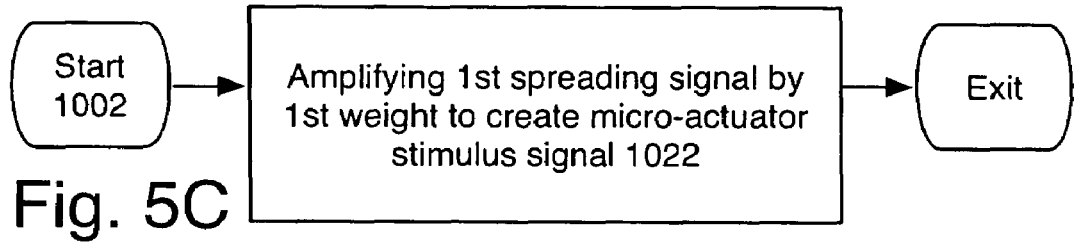
Figure 5D:
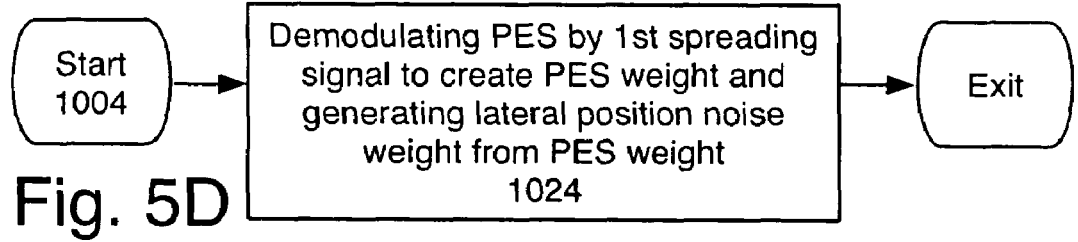
Figure 5E:
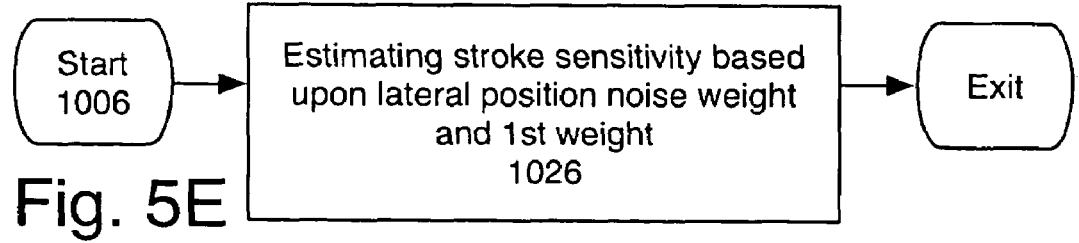
Figure 5F:
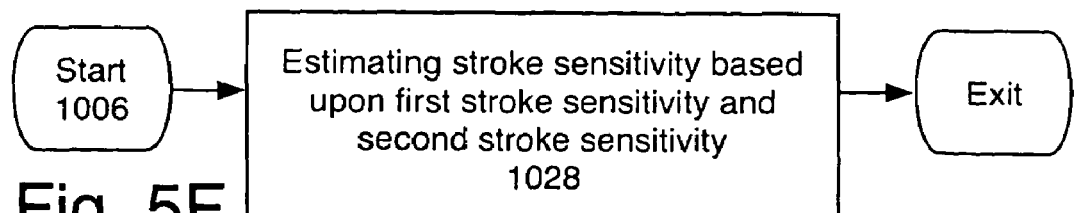

Similarly to the discussion of FIGS. 5C to 5E, using 1500 the micro-actuator stimulus signal 650 may further include amplifying a second spreading signal 656 of FIG. 2 by a second weight 658 to create the micro-actuator stimulus signal. Deriving 1510 the lateral position noise 638 may further include demodulating the Position Error Signal 260 by the second spreading signal to create a second PES weight 660. Estimating 1520 the stroke sensitivity 634 may further include estimating a second stroke sensitivity 664 based upon the second lateral position noise and upon the second weight. Estimating the stroke sensitivity, as shown in Operation 1028 in FIG. 5F, may be based upon the stroke sensitivity estimated in FIG. 5E, which will be known as the first stroke sensitivity 662 and upon the second stroke sensitivity.

Similarly to the discussion of FIGS. 4C and 4D, Operation 1028 estimating 1520 the stroke sensitivity may include, but is not limited to, averaging the first stroke sensitivity 662 and the second stroke sensitivity 664 to create the stroke sensitivity 634, or weighted-averaging the first stroke sensitivity and the second stroke sensitivity to create the stroke sensitivity.

Figure 6A:
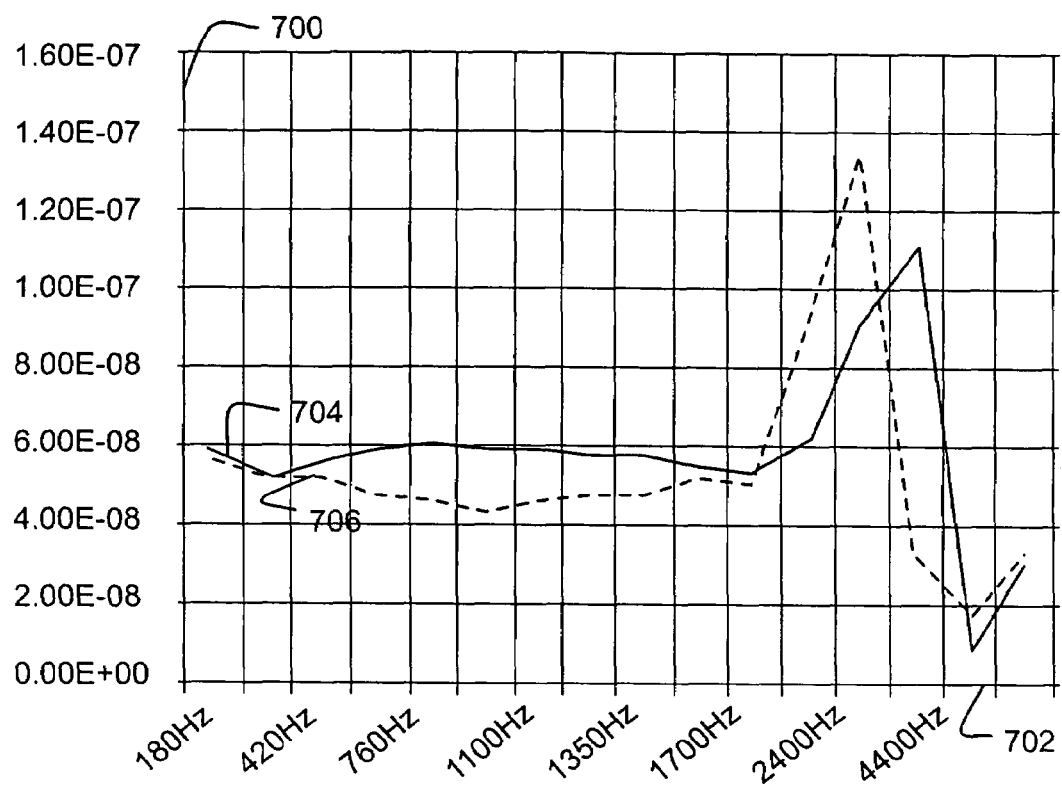
FIGS. 6A and 6B show some results of experiments involving the method of estimation.
Figure 6B:
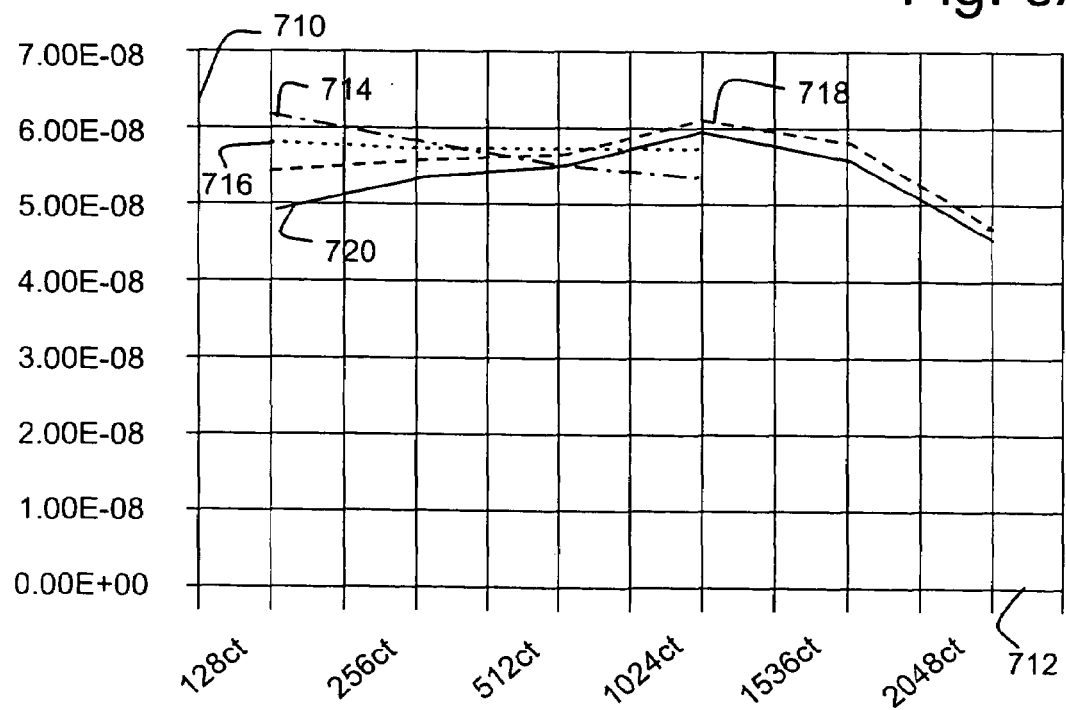

Before going on with the discussion of the invention, let us consider some examples based upon experimental results, as shown in FIGS. 6A and 6B. Both Figures include a vertical axis and a horizontal axis.

FIG. 6A includes a first vertical axis 700, which represents the stroke sensitivity in units of nanometers per Volt, and a first horizontal axis 702, which represents the injection frequency in terms of Herz (Hz). First trace 704 shows the stroke sensitivity 634 of a first hard disk drive 10 for a first frequency 630 ranging from 180 Hz to 4400 Hz. Second trace 706 shows the stroke sensitivity of a second hard disk drive for a first frequency ranging from 180 Hz to 4400 Hz.

FIG. 6B includes a second vertical axis 710, which represents the stroke sensitivity of the first hard disk drive 10 used in FIG. 6A in units of nanometers per Volt, and a second horizontal axis 712, which represents the micro-actuator stimulus signal in terms of the micro-actuator driver's the digital to analog converter 280 of FIGS. 3E and 3F. The third trace 714 shows the stroke sensitivity 634 for a first frequency 630 of 540 Hz and the micro-actuator stimulus signal varying from 128 to 2048 counts. The fourth trace 716 shows the stroke sensitivity for a first frequency of 760 Hz and the micro-actuator stimulus signal varying from 128 to 2048 counts. The fifth trace 718 shows the stroke sensitivity for a first frequency of 1350 Hz and the micro-actuator stimulus signal varying from 128 to 1024 counts. The sixth trace 720 shows the stroke sensitivity for a first frequency of 1700 Hz and the micro-actuator stimulus signal varying from 128 to 1024 counts.

In both FIGS. 6A and 6B, the standard deviation of the lateral position noise for these experiments is essentially zero, which is the horizontal axis.

Consider the following model of the inventions method of estimating the stroke sensitivity 634 as shown in FIG. 7A when the voice coil motor 18 is in track-following mode, positioning the read-write head 94 near the track 122 on the rotating disk surface 120-1 as shown in FIGS. 1 and 2. The Voice Coil Motor Control 2010 drives the Voice Coil Motor Plant 2020 with the voice coil signal 22 and the micro-actuator stimulus signal 634 is injected into the Micro-actuator Plant 2050. These two effects are added by second sumer 2030 to create a state, which is the summed output of these two effects, called abpos. The transfer function from the injection of the micro-actuator stimulus to the summed output abpos is $$TF = \frac{P_2}{1+P_1 C_1} = ESF_{VCM} \cdot P_2 \qquad (1.1)$$

Where $ESF_{VCM}$ denotes the Error Sensitivity Function of the Voice Coil Motor 18, $P_1$ denotes the effect of the Voice Coil Plant 2020, $C_1$ denotes the effect of the Voice Coil Motor Control 2010, and $P_2$ denotes the effect of the Micro-actuator Plant 2050. The error sensitivity function may be measured at a specific cylinder, more specifically, at a track number 652 for one or more frequencies of interest. The inventors have found that the frequency response of the error sensitivity function is flat up to a certain frequency, as shown in FIG. 6A.

The stroke sensitivity 634 may be defined as a Direct Current (DC) gain of the frequency response of the Error Sensitivity Function of the voice coil motor. More specifically, for a first frequency $\omega_0$, the gain of $P_2$ may be calculated by $$|P_2(\omega_0)| = \left|\frac{1}{ESF_{VCM}(\omega_0)}\right| \cdot \left|\frac{abpos(\omega_0)}{inj(\omega_0)}\right| \qquad (1.2)$$

The magnitude of the ratio of the injection of the micro-actuator stimulus signal 634 to abpos may be obtained by performing a Fast Fourier Transform on the Position Error Signal 260. The calculated gain of $P_2$ at the frequency $\omega_0$ is the DC gain of the frequency response of the micro-actuator 80, which closely approximates, and may often be, the stroke sensitivity 634.

Figure 8A:
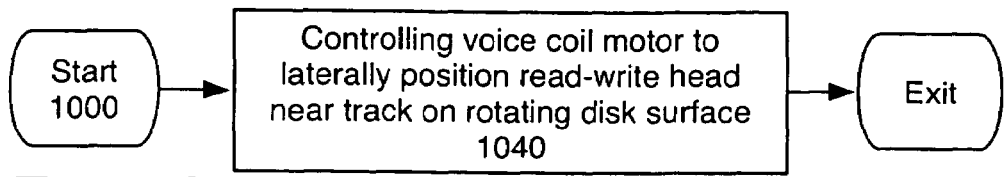
Figure 8B:
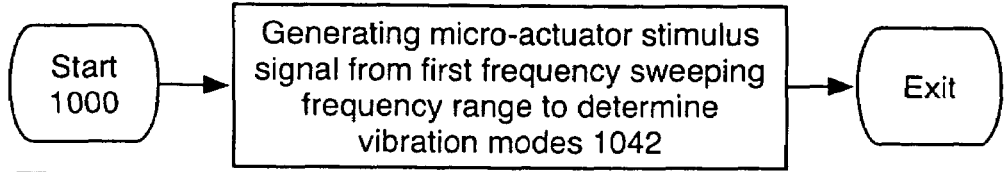

Additionally, by generating the micro-actuator stimulus signal 634 from the first frequency 630 by sweeping through a range of frequencies, vibration mode peaks can be identified up to the sampling frequency of the voice coil motor 18 while the hard disk drive 10 is in track-following mode, which is supported by Operation 1042 in FIG. 8B. This can often be done when the output of the Digital to Analog Converter 280 is set to twice the sampling frequency of the voice coil motor.

Consider estimating the stroke sensitivity 634 for a micro-actuator stimulus signal 650 at a first frequency 630, for example, at 540 Hz, and for the micro-actuator stimulus signal at a second frequency 632, at 1700 Hz, both with a first amplitude of 636 of 512 counts. The average of these stroke sensitivity estimates can be visually estimated from the third trace 714 and the sixth trace 720 of FIG. 6B. Preferably, the first frequency 630 and the second frequency 632 both belong within the range of flat frequency response for the micro-actuator 80.

Over time, the micro-actuator 80 in the hard disk drive 10 may not function as well as when it was manufactured. The range of flat frequency response may decline in bandwidth. Consider generating the micro-actuator stimulus signal may include a first spreading signal 644, which by way of example may have the form of a sum of sinusoidal signals, say at 420 Hz, 760 Hz, 1100 Hz, and 1350 Hz, which are all in the flat frequency response range of the micro-actuator 80 as shown in FIG. 6A. A second spreading signal 656 may have the form of a sum of the sinusoidal signals at 180 Hz, 420 Hz, 760 Hz, 1100 Hz, 1350 Hz, and 1700 Hz.

In this example, the first bandwidth 674, shown in FIG. 7C, which is the bandwidth of the first spreading signal 644 is contained in the second bandwidth 676, the bandwidth of the second spreading signal 656. Let's consider the example in further detail. Let $S_1(t) \equiv \Sigma_{k=1}^{4} \sin(a_k t + b_k)$ and $S_2(t) \equiv \Sigma_{k=0}^{5} \sin(a_k t + b_k)$ be the first spreading signal 644 and the second spreading signal 656, respectively. Let $w_1$ be the first weight 646, and $w_2$ be the second weight 658. Let $s_1$ be the first stroke sensitivity 662 estimated with the micro-actuator stimulus signal 650 generated by $w_1 S_1(t)$, the first spreading signal multiplied by the first weight, creating $N_1(t)$, the lateral position noise 628. Let $s_2$ be the second stroke sensitivity 664 estimated with the micro-actuator stimulus signal generated by $w_2 S_2(t)$, the second spreading signal multiplied by the second weight, creating $N_2(t)$, the second lateral position noise 680.

In the following discussion, the integrals are over the same time interval, which provides sufficient samples to perform the FFT mentioned earlier.

Our first task will be to demodulate the lateral position noise 628, $N_1(t)$ by the first spreading signal 644, $S_1(t)$ and estimate the first stroke sensitivity 622, $s_1$. Decompose $N_1(t) S_1(t)$ to the least square closest fit of $$\sum_{k=1}^{4} N_{1k} \sin(a_k t + b_k)$$

by minimizing the first Euclidean distance:

$$E_1 \equiv \int \left[ N_1(t) S_1(t) - \sum_{k=1}^{4} N_{1k} \sin(a_k t + b_k) \right]^2 dt \quad (1.3)$$

$$= \int \left[ \sum_{k=1}^{4} (N_1(t) - N_{1k}) \sin(a_k t + b_k) \right]^2 dt$$

which is a non-negative and smooth real-valued function of the $N_{1k}$, and will have a minima when $\partial E_1 / \partial N_{1j} = 0$, for each $j = 1, \ldots, 4$, which becomes $$\frac{\partial E_1}{\partial N_{1j}} = \frac{\partial}{\partial N_{1j}} \int \left[ \sum_{k=1}^{4} (N_1(t) - N_{1k}) \sin(a_k t + b_k) \right]^2 dt \quad (1.4)$$

$$= -2N_{1j} \int \left[ \sum_{k=1}^{4} (N_1(t) - N_{1k}) \sin(a_k t + b_k) \right] \sin(a_j t + b_j) dt$$

$$= -2N_{1j} \sum_{k=1}^{4} \int N_1(t) \sin(a_k t + b_k) \sin(a_j t + b_j) dt +$$

$$2N_{1j} \int \left[ \sum_{k=1}^{4} N_{1k} \sin(a_k t + b_k) \right] \sin(a_j t + b_j) dt$$

Assuming for the moment that each $N_{1j} \neq 0$ allows the removal of $2N_{1j}$ as a common factor in the last version of (1.6) and applying $\partial E_1 / \partial N_{1j} = 0$ yields the following linear system of equations for $j = 1, \ldots, 4$:

$$\sum_{k=1}^{4} N_{1k} \int \sin(a_k t + b_k) \sin(a_j t + b_j) dt = \quad (1.5)$$

$$\sum_{k=1}^{4} \int N_1(t) \sin(a_k t + b_k) \sin(a_j t + b_j) dt$$

which has a solution, $N_{1j}$ for $j = 1, \ldots, 4$. Similarly estimate the first stroke sensitivity $s_1$ as minimizing $$\Sigma_{k=1}^{4} [N_{1k} - s_1 w_1]^2 \quad (1.6)$$

Again, this is a non-negative and smooth function of $s_1$, possessing a minimum when $$\frac{d \sum_{k=1}^{4} [N_{1k} - s_1 w_1]^2}{d s_1} = 0 \quad (1.7)$$

Further deriving this relationship $$-2w_1 \Sigma_{k=1}^{4} [N_{1k} - s_1 w_1] = 0 \quad (1.8)$$

which assuming $w_1 \neq 0$, becomes $\Sigma_{k=1}^{4} N_{1k} = 4 s_1 w_1$ and makes $$s_1 = \Sigma_{k=1}^{4} N_{1k} / 4 w_1 \quad (1.9)$$

Now demodulating the second lateral position noise 680, $N_2(t)$ by the second spreading signal 656, $S_2(t)$ and estimating the second stroke sensitivity 664, $s_2$. Decompose $N_2(t) S_2(t)$ to the least square closest fit of $$\sum_{k=0}^{5} N_{2k} \sin(a_k t + b_k)$$

by minimizing the second Euclidean distance:

$$E_2 \equiv \int [N_2(t) S_2(t) - \Sigma_{k=0}^{5} N_{2k} \sin(a_k t + b_k)]^2 dt \quad (1.10)$$

which is a non-negative and smooth real-valued function of the $N_{2k}$, and will have a minima when $\partial E_1 / \partial N_{1j} = 0$, for each $j = 1, \ldots, 4$, which leads in a similar fashion to the following linear system of equations for $j = 0, \ldots, 5$:

$$\sum_{k=0}^{5} N_{2k} \int \sin(a_k t + b_k) \sin(a_j t + b_j) dt = \quad (1.11)$$

$$\sum_{k=0}^{5} \int N_2(t) \sin(a_k t + b_k) \sin(a_j t + b_j) dt$$

which has a solution, $N_{2j}$ for $j = 0, \ldots, 5$. Similarly estimate the first stroke sensitivity $s_1$ as minimizing $$\Sigma_{k=0}^{5} [N_{2k} - s_2 w_2]^2 \quad (1.12)$$

Again, this is a non-negative and smooth function of $s_2$, possessing a minimum when $$\frac{d \sum_{k=0}^{5} [N_{2k} - s_2 w_2]^2}{ds_2} = 0 \quad (1.13)$$

which assuming $w_1 \neq 0$, leads to $$s_2 = \Sigma_{k=0}^{5} N_{2k}/6w_2 \quad (1.14)$$

The method, shown here as a refinement of the example implementation of the program system 1000 of FIG. 1 may further include the following, as shown in FIG. 7B. Operation 1030 supports determining a first distance 670 between the lateral position noise 638 and the first spreading signal 644 multiplied by the first weight 646. Operation 1032 supports determining a second distance 672 between the second lateral position noise 680 and the second spreading signal 656 multiplied by the second weight 658. Operation 1034 supports determining an operational bandwidth 678 for the micro-actuator 80 based upon the first distance for the bandwidth of the first spreading signal and based upon the second distance for the bandwidth of the second spreading signal.

To further develop our example, calculate the first distance 670 as $$F_1 \equiv \Sigma_{k=1}^{4} [N_{1k} - s_1 w_1]^2 \quad (1.15)$$

and calculate the second distance 672 as $$F_2 \equiv \Sigma_{k=0}^{5} [N_{2k} - s_2 w_2]^2. \quad (1.16)$$

Determining the operational bandwidth 678 may be done in a variety of ways. For example, when the first distance 670 is within a tolerance 682 of the second distance 672, the operational bandwidth 678 may be the second bandwidth 676, the bandwidth of the second spreading signal 656. When the first distance is more than the tolerance from the second distance, the operational bandwidth may be the first bandwidth 674, the bandwidth of the first spreading signal 644.

Alternatively and/or additionally, when the second distance 672 is less than a second tolerance 684, the operational bandwidth 678 may be the second bandwidth 676, the bandwidth of the second spreading signal 656. And when the first distance 670 is less than the second tolerance and the second distance is greater than the second tolerance, the operational bandwidth may be the first bandwidth 674, the bandwidth of the first spreading signal 644. The method may include various alternatives and refinements. When the second distance is less than or equal to the second tolerance, the operational bandwidth may be the bandwidth of the second spreading signal. And when the first distance is less than or equal to the second tolerance and the second distance is greater than the second tolerance, the operational bandwidth may be the bandwidth of the first spreading signal. Another alternative, when the first distance is less than the second tolerance and the second distance is greater than or equal to the second tolerance, the operational bandwidth may be the bandwidth of the first spreading signal.

Determining the operational bandwidth 678 may include when the first distance 670 is greater than the second tolerance 684, the operational bandwidth is non-functional. In certain embodiments, the operational bandwidth being non-functional may include a bandwidth of 0 Hz.

The method of operating the hard disk drive may be implemented by the program system 1000 of FIGS. 1, 4A to 5F, and 7B to include operation 1040 of FIG. 8A, controlling the voice coil motor 18 to laterally position the read-write head 94 near the track 122 on the rotating disk surface 120-1.

In certain embodiments, the method of estimating may be used to create the stroke sensitivity 634 during the initialization/calibration phase of manufacturing the hard disk drive 10. This stage often occurs after the hard disk drive is assembled. The method estimates the stroke sensitivity for at least one micro-actuator 80. If the hard disk drive includes more than one micro-actuator as in FIG. 8B, the method may preferably perform the estimate for each of the micro-actuators.

During the initialization/calibration phase, the stroke sensitivity 634 may preferably be estimated for more than one track 122. Often the stroke sensitivity for one or more tracks near the inside diameter ID and/or one or more tracks near the outside diameter OD are estimated. In certain embodiments, a table of stroke sensitivity estimates is constructed for collections of adjacent tracks on the rotating disk surface is created and used.

In certain embodiments, the method of estimating may be implemented as the program system 1000 with its program steps residing in a volatile memory component of the memory 620, the stroke sensitivity 634 estimate or estimates are the product of this manufacturing process, which are usually stored in a non-volatile memory component of the memory.

Alternatively, the program system 1000 may be implemented with its program steps residing in a non-volatile memory component of the memory 620. These embodiments are useful in estimate the stroke sensitivity throughout the life of the hard disk drive 10.

In certain aspects of the invention, an embedded circuit 500 may include the servo-controller 600. A hard disk drive 10 may include the servo-controller, and possibly the embedded circuit, coupled to the voice coil motor 18, to provide the micro-actuator stimulus signal 650 driving the micro-actuator 80, and a read differential signal pair contained in the read and write differential signal pairs rw0 from the read-write head 94 to the servo-controller to generate the Position Error Signal 260.

The invention includes making the servo-controller 600, possibly the embedded circuit 500, as well as the hard disk drive 10. The servo-controller, the embedded circuit, and the hard disk drive are products of these processes.

Making the embedded circuit 500, and in some embodiments, the servo-controller 600, may include installing the servo computer 610 and the memory 620 into the servo-controller and programming the memory with the program system 1000 to create the servo controller and/or the embedded circuit. Making the embedded circuits, and in some embodiments, the servo-controller, may alternatively include installing at least one of the means for using 1500, the means for deriving 1510, and the means for estimating 1520 to create the servo-controller and/or the embedded circuit.

The invention's hard disk drive 10 may include the servo-controller 600 and/or the embedded circuit 500 coupled to the voice coil motor 18, to provide the micro-actuator stimulus signal 650 driving the micro-actuator 80, and a read differential signal pair as part of the read and write differential signal pairs rw0 from the read-write head 94 to the servo-controller to generate the Position Error Signal 260.

Making the hard disk drive 10 may include coupling the servo-controller 600 and/or the embedded circuit 500 to the voice coil motor 18, providing the micro-actuator stimulus signal 650 to drive the micro-actuator 80, and the read and write differential signal pairs rw0 include a read differential signal pair from the read-write head to the servo-controller to generate the Position Error Signal 260.

The invention includes a method of operating the micro-actuator using the stroke sensitivity. Aspects of the invention include the servo-controller supporting the method of operating the micro-actuator. The servo controller may include the servo computer accessibly coupled to the memory as before, but directed by a second program system including program steps residing in the memory.

While the invention claims and discloses that the servo controller may include more than one computer embodying the various means as discussed before, for the sake of simplifying the discussion, we will proceed by discussing only the embodiment where there is one computer, the servo computer. It is common that the hard disk drive and/or the embedded circuit contain a second computer, which often deals with error control coding/decoding of tracks and memory management tasks.

Figure 9:
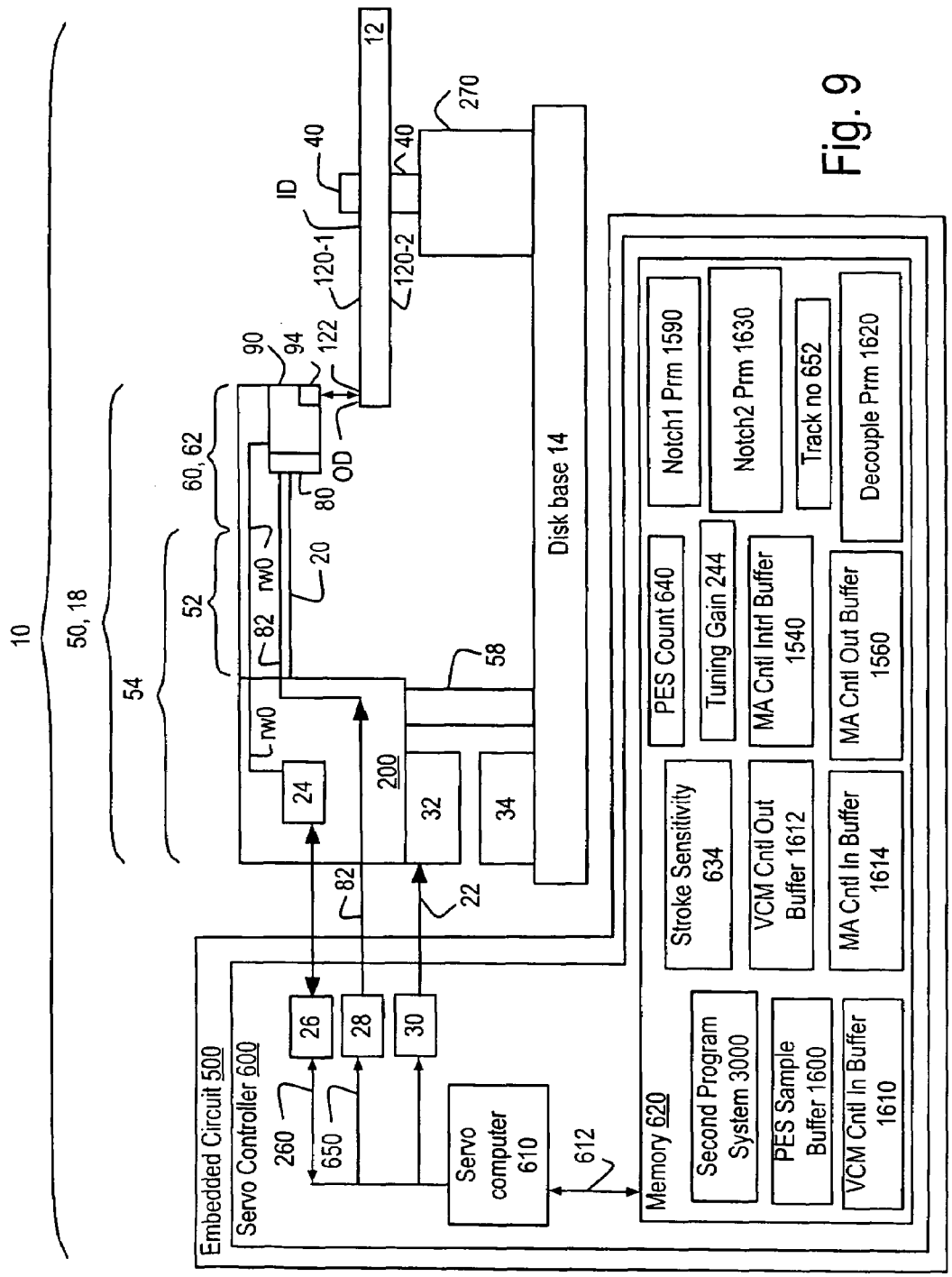
FIG. 9 shows a schematic diagram of a hard disk drive built in accord with the invention.
Figure 10A:
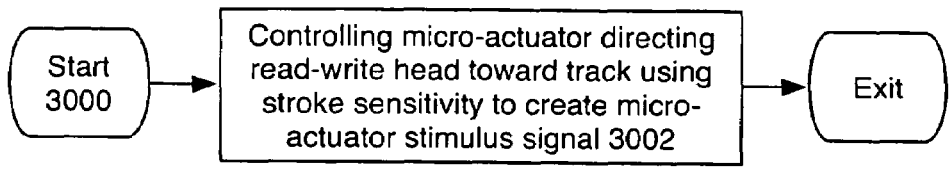
FIGS. 10A to 12B show some details of using the stroke sensitivity as a product of the estimation process to operate the hard disk drive.
Figure 10B:
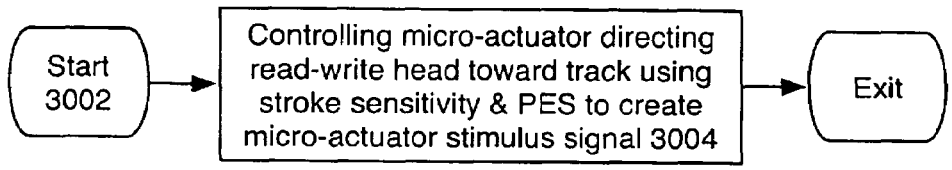
Figure 10C:
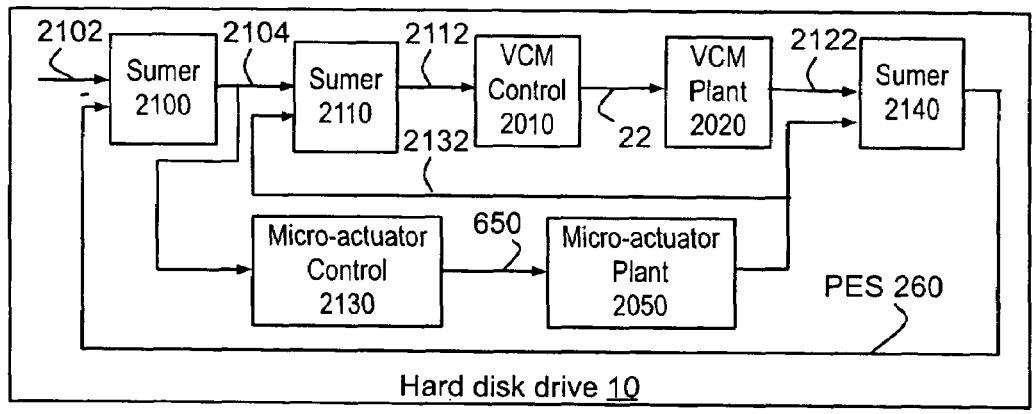

The servo controller 600 may include a second program system 3000 as shown in FIG. 9. The method of operating the micro-actuator 80 using the stroke sensitivity 634, will be discussed in terms of the second program system as shown in FIG. 9 and subsequent Figures. Operation 3002 supports controlling the micro-actuator 80 directing the read-write head 94 toward the track 122 using the stroke sensitivity 634 to create the micro-actuator stimulus signal 650, as shown in FIG. 10A. The micro-actuator may be further controlled using the stroke sensitivity and based upon the Position Error Signal 260 to create the micro-actuator stimulus signal, which is supported by Operation 3004 in FIG. 10B. The micro-actuator control 2130 of FIG. 10C may be implemented at least in part by Operation 3002 and/or 3004.

Figure 10D:
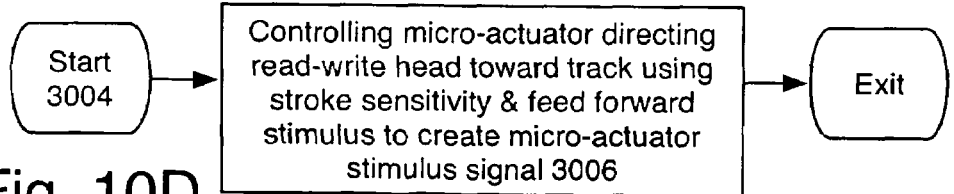

The method may further include subtracting 2100 the Position Error Signal 260 from the lateral positioning 2102 to create a feed-forward stimulus 2104, and controlling 2010 the voice coil motor based upon the feed-forward stimulus to create a voice coil stimulus 22. The first sumer 2100 subtracts the Position Error Signal 260 from the on track lateral control 2102 to create the feed-forward stimulus 2104. The means for controlling the voice coil motor is shown as the Voice Coil Motor Control 2010 of FIG. 10C. The means for controlling the micro-actuator 80 is shown as controlling the micro-actuator 2130, which may further include Operation 3006 of FIG. 10D controlling the micro-actuator using the stroke sensitivity 634 and based upon the feed-forward stimulus to create the micro-actuator stimulus signal 650.

Some further details, a third sumer 2110 subtracts the micro-actuator plant effect 2132 from the feed-forward stimulus 2104 to create the voice coil motor control input 2112. The voice coil motor plant 2020 generates a voice coil motor effect 2122, which is presented with the micro-actuator plant effect 2132 to the fourth sumer 2140 to create the Position Error Signal 260.

Figure 11A:
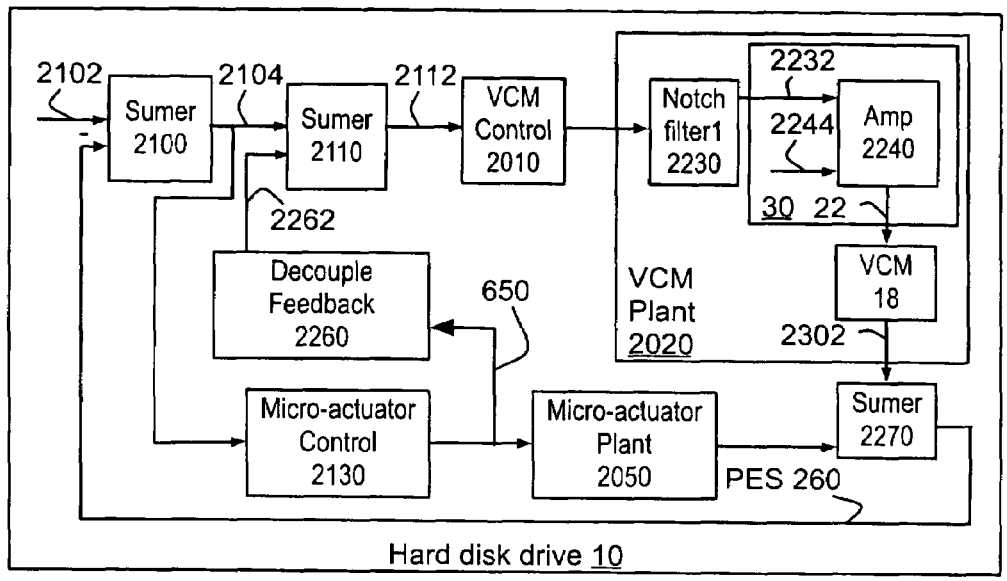
Figure 11B:
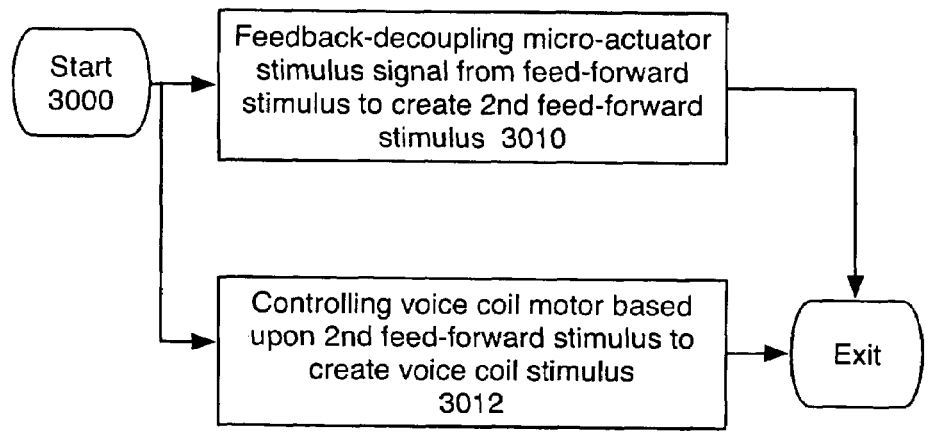

Controlling the voice coil motor 18 may include feedback-decoupling the micro-actuator stimulus signal 650 from the feed-forward stimulus 2104 to create a second feed-forward stimulus 2112, and controlling 2010 the voice coil motor 18 based upon the second feed-forward stimulus to create a voice coil stimulus 22, as shown in FIG. 11A and 11B. This may be at least partly implemented within the second program system 3000 further including Operation 3010 supporting feedback-decoupling the micro-actuator stimulus signal from the feed-forward stimulus to create a second feed-forward stimulus. And Operation 3012, which supports controlling the voice coil motor based upon the second feed-forward stimulus to create a voice coil stimulus.

Figure 12A:
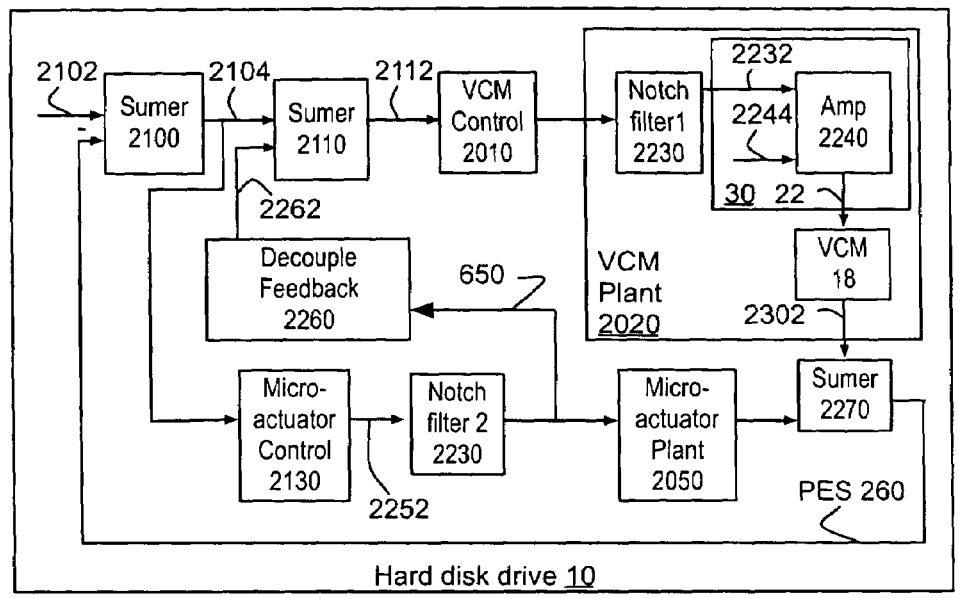

Further details relating to FIG. 11A and 12A, regard the voice coil motor plant 2020, which may preferably include a first notch filter 2230 providing a notch filtered voice coil control 2232 to the voice coil driver 30, of FIGS. 1, 2 and 9, to create the voice coil signal 22. The voice coil driver may further preferably include a voice coil amplifier 2240. The voice coil amplifier may be driven by the notch filterer voice coil control, and sometimes also be a tuning gain 2244. The voice coil amplifier may preferably create the voice coil signal 22.

Figure 12B:
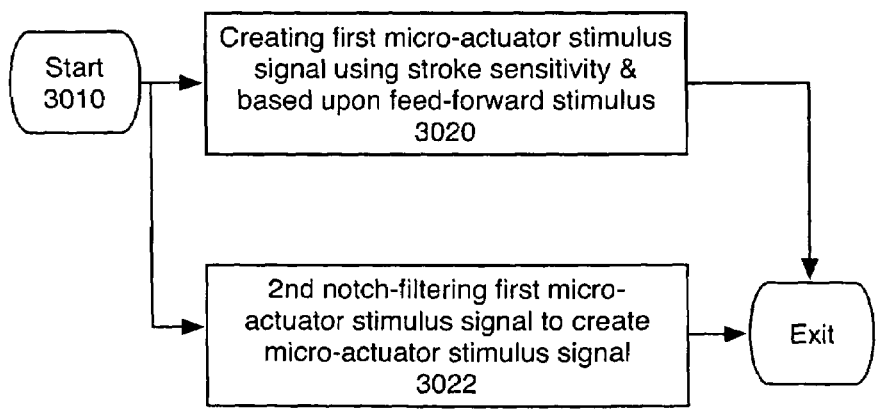

Controlling the micro-actuator 80 may further include creating a first micro-actuator stimulus signal 2252 using the stroke sensitivity 634 and based upon the feed-forward stimulus 2104, and second notch-filtering 2250 the first micro-actuator stimulus signal to create the micro-actuator stimulus signal 650, as shown in FIG. 12A and 12B. Operation 3010 of FIG. 11B may further include Operation 3020 of FIG. 12B, supporting creating the first micro-actuator stimulus signal 2252 using the stroke sensitivity 634 and based upon the feed-forward stimulus 2104. And Operation 3022, which supports second notch-filtering the first micro-actuator stimulus signal to create the micro-actuator stimulus signal.

Making the servo controller 600 and/or the embedded circuit 500 may further include programming the memory 620 with the second program system 3000 to create the servo controller and/or the embedded circuit, preferably programming a non-volatile memory component of the memory.

The second program system 3000 may further support estimating the operational bandwidth 6678 of the micro-actuator 80. The operational bandwidth in certain instances may degrade over the life of the hard disk drive 10. When the operation bandwidth is non-functional the micro-actuator may be less useful, and in certain cases, may be non-functional.

Looking at some of the details of FIGS. 1, 2, 8B, and 9, the hard disk drive 10 includes a disk 12 and a second disk 12-2. The disk includes the rotating disk surface 120-1 and a second rotating disk surface 120-2. The second disk includes a third rotating disk surface 120-3 and a fourth rotating disk surface 120-4. The voice coil motor 18 includes an head stack assembly 50 pivoting through an actuator pivot 58 mounted on the disk base 14, in response to the voice coil 32 mounted on the head stack 54 interacting with the fixed magnet 34 mounted on the disk base. The actuator assembly includes the head stack with at least one actuator arm 52 coupling to a slider 90 containing the read-write head 94. The slider is coupled to the micro-actuator 80.

FIG. 9 further shows the head stack assembly including more than one actuator arm, in particular, a second actuator arm 52-2 and a third actuator arm 52-3. Each of the actuator arms is coupled to at least one slider, in particular, the second actuator arm couples to a second slider 90-2 and a third slider 90-3, and the third actuator arm couples to a fourth slider 90-4. Each of these sliders contains a read-write head, for example, the second slider contains the second read-write head 94-2, the third slider contains the third read-write head 94-3, and the fourth slider contains the fourth read-write head 94-4. Each of these sliders is preferably coupled to a micro-actuator, for example, the second slider is coupled to the second micro-actuator 80-2, the third slider is coupled to the third micro-actuator 80-3, and the fourth slider is coupled to the fourth micro-actuator 80-4.

The read-write head 94 interfaces through a preamplifier 24 on a main flex circuit 200 using a read and write differential signals rw0 typically provided by the flexure finger 20, to a channel interface 26 often located within the servo controller 600. The channel interface often provides the Position Error Signal 260 (PES) within the servo controller. It may be preferred that the micro-actuator stimulus signal 650 be shared when the hard disk drive includes more than one micro-actuator. It may be further preferred that the lateral control signal 82 be shared, as shown in FIG. 8B. Typically, each read-write head interfaces with the preamplifier using a separate read and write differential signal pair, typically provided by a separate flexure finger. For example, the second read-write head 94-2 interfaces with the preamplifier via a second flexure finger 20-2, the third read-write head 94-3 via the a third flexure finger 20-3, and the fourth read-write head 94-4 via a fourth flexure finger 20-4.

Returning to FIG. 9, a PES sample buffer 1600 may store a succession of the Position Error Signal 260 readings, which are often preferably represented as the PES count 640. A voice coil motor control input buffer 1610 may include a succession of inputs to the voice coil motor control 2010 of FIGS. 7A, 10C, 11A, and 12A. A voice coil motor control output buffer 1612 may include a succession of outputs from the voice coil motor control. A micro-actuator control input buffer 1614 may include a succession of inputs to the micro-actuator control 2130, a micro-actuator control internal buffer 1540 may include a succession of internal values, and a micro-actuator control output buffer 1560 may include a succession of outputs from the micro-actuator control. The first notch filter 2230 may be directed by the first notch filter parameter list 1590. The second notch filer 2250 may be directed by the second notch filter parameter list 1630. Feedback-decoupling 2260 may be directed by a decoupling filter parameter list 1620.

Figure 13A:
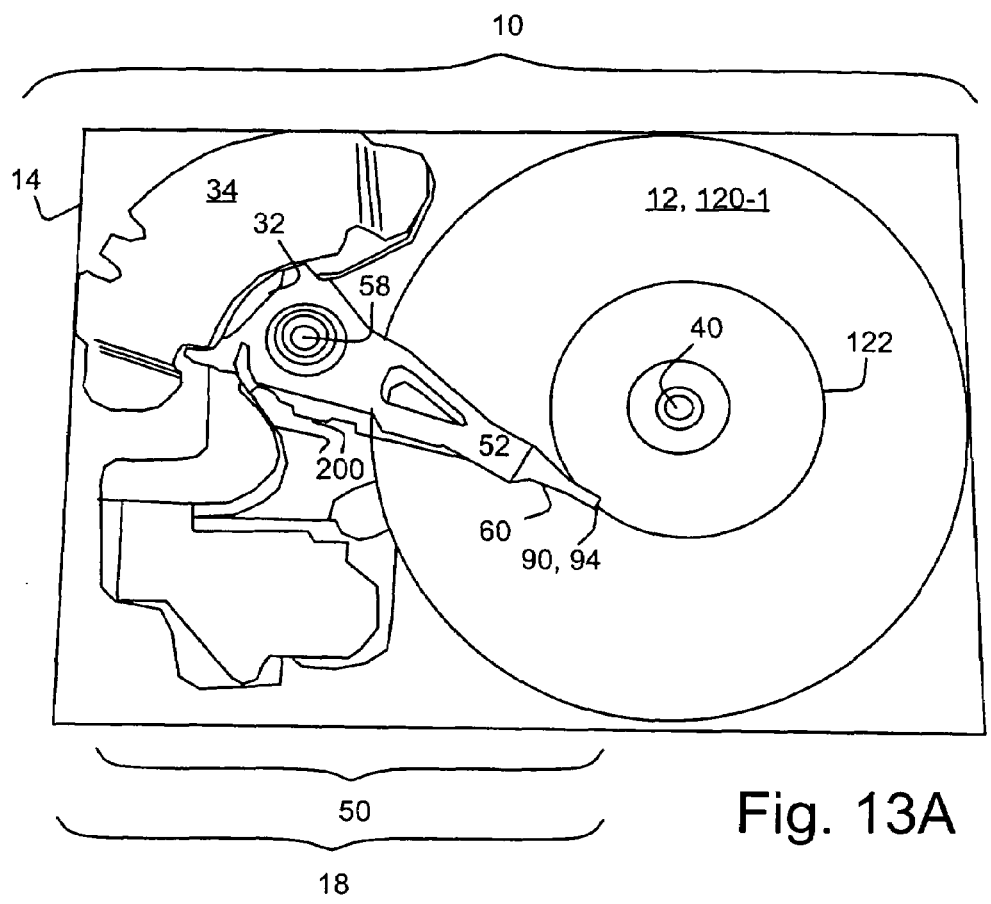
FIG. 13A shows some details of the hard disk drives of the previous Figures.
Figure 13B:
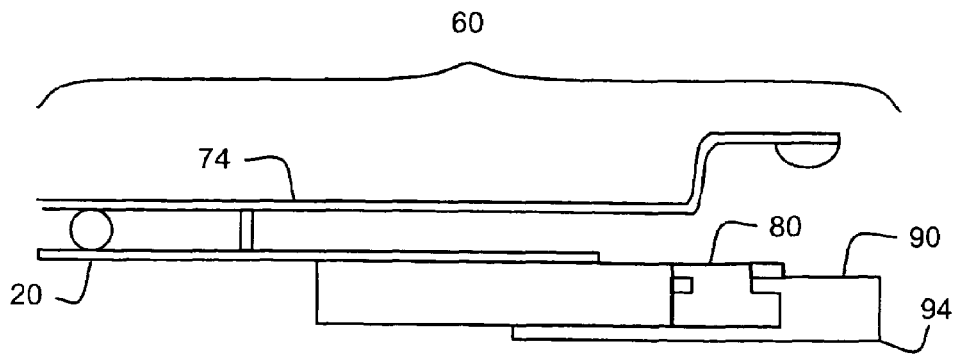
FIGS. 13B and 14 show some details of head gimbal assemblies, in particular, their micro-actuators, as used in the invention's hard disk drives.
Figure 14:
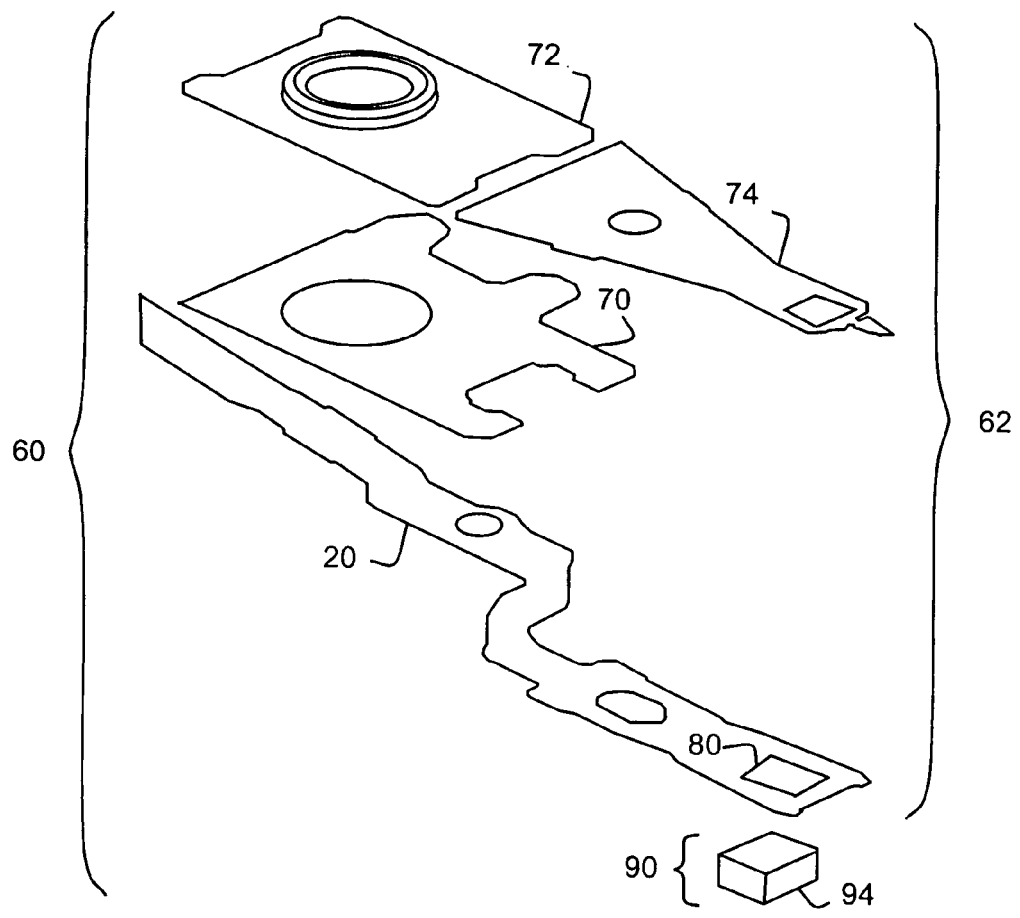

Returning to FIGS. 1, 2, 9, 10C, 11A, 12A and 13A, the slider 90 is mounted on a head gimbal assembly 60, which is coupled to the actuator arm 52. FIGS. 13B and 14 show a side view and an exploded view of the head gimbal assembly. A head suspension assembly 62 is often used as a basis for building the head gimbal assembly. Both the head suspension assembly and the head gimbal assembly include a base plate 72 coupled through a hinge 70 to a load beam 74. Often the flexure finger 20 is coupled to the load beam and the micro-actuator 80 and slider 90 are coupled through the flexure finger to the head gimbal assembly.

The micro-actuator 80 as used herein preferably provides lateral positioning of the read-write head 94 near the track 122. In certain embodiments the micro-actuator may also provided vertical positioning. The micro-actuator may use a piezoelectric effect and/or an electro-static effect in providing lateral and/or vertical positioning.

During normal disk access operations, the embedded circuit 500 and/or the servo controller 600 direct the spindle motor 270 to rotate the spindle shaft 40. This rotating is very stable, providing a nearly constant rotational rate through the spindle shaft to at least one disk 12, and as shown in some of the Figures, sometimes more than one disk. The rotation of the disk creates the rotating disk surface 120-1, used to access the track 122 during track following mode, as discussed elsewhere. These accesses normally provide for reading the track and/or writing the track.

Figure 8C:
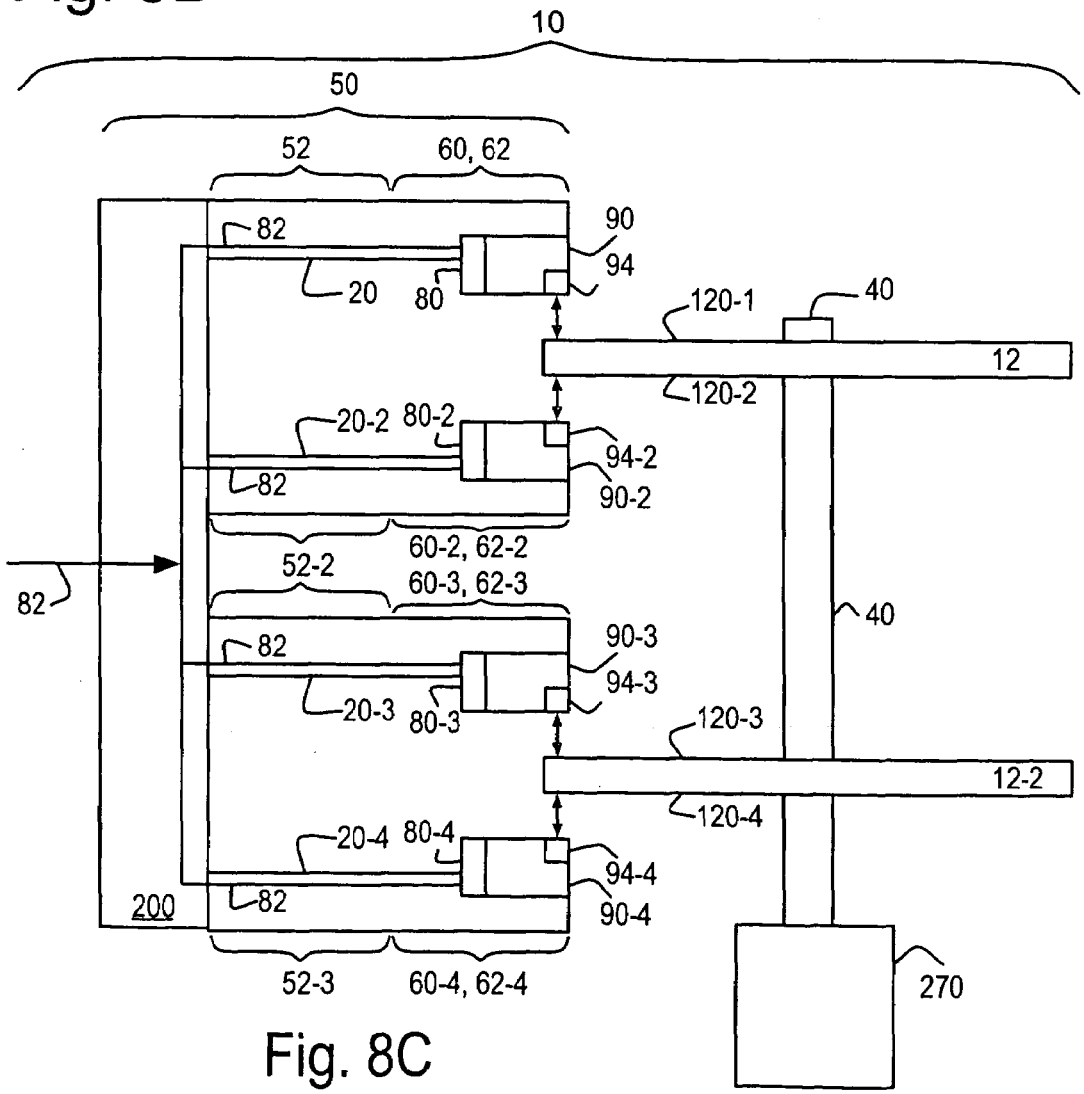
FIG. 8C shows some details of the invention's hard disk drive.

Returning to FIG. 8C, the actuator arm 52 couples through the head gimbal assembly 60 to the slider 90, its read-write head 94, the micro-actuator 80 and the flexure finger 20 electrically coupling the lateral control signal 82 to the micro-actuator. The second actuator arm 52-2 couples through the second head gimbal assembly 60-2 to the second slider 90-2, its second read-write head 94-2, the second micro-actuator 80-2 and the second flexure finger 20-2 electrically coupling the lateral control signal to the second micro-actuator. The second actuator arm 52-2 also couples through the third head gimbal assembly 60-3 to the third slider 90-3, its third read-write head 94-3, the third micro-actuator 80-3 and the third flexure finger 20-3 electrically coupling the lateral control signal to the third micro-actuator. The third actuator arm 52-3 couples through the fourth head gimbal assembly 60-4 to the fourth slider 90-4, its fourth read-write head 94-4, the fourth micro-actuator 80-4 and the fourth flexure finger 20-4 electrically coupling the lateral control signal to the fourth micro-actuator The preceding embodiments provide examples of the invention and are not meant to constrain the scope of the following claims.

What is claimed is:

1. A method comprising the step of estimating the stroke sensitivity of a micro-actuator, consisting of the steps:
   using a micro-actuator stimulus signal driving said micro-actuator to induce noise into the lateral positioning of a read-write head near a track by the voice coil motor to create the Position Error Signal;
   deriving the lateral position noise from said Position Error Signal; and
   estimating said stroke sensitivity based upon said lateral position noise induced by said micro-actuator stimulus signal as a Direct Current gain of a frequency response of the Error Sensitivity Function of said voice coil motor within an operational bandwidth of said micro-actuator;
   and determining said operational bandwidth of said micro-actuator;
   wherein said micro-actuator is coupled to a slider including said read-write head near a rotating disk surface containing said track.

2. The method of claim 1, wherein the step using said micro-actuator stimulus signal, further comprises the step:
   generating said micro-actuator stimulus signal with a first amplitude at a first frequency;
   wherein the step deriving said lateral position noise, further comprises the step:
   deriving said lateral position noise at said first frequency from said Position Error Signal at said first frequency; and
   wherein the step estimating said stroke sensitivity, further comprises the step:
   estimating said stroke sensitivity at said first frequency based upon said lateral position noise at said first frequency and upon said first amplitude.

3. The method of claim 2, wherein the step estimating said stroke sensitivity at said first frequency, further comprises the step:
   said lateral position noise at said first frequency divided by said first amplitude to create said stroke sensitivity at said first frequency.

4. The method of claim 3, wherein the step estimating said stroke sensitivity at said first frequency, further comprises the step:
   said lateral position noise at said first frequency, multiplied by a scaling constant, and divided by said first amplitude to create said stroke sensitivity at said first frequency.

5. The method of claim 2, wherein the step: using said micro-actuator signal, further comprises the step:
   generating said micro-actuator stimulus signal with a first amplitude at a second frequency;
   wherein the step deriving said lateral position noise, further comprises the step:
   deriving said lateral position noise at said second frequency from said Position Error Signal at said second frequency; and
   wherein the step estimating said stroke sensitivity, further comprises the steps:

estimating said stroke sensitivity at said second frequency based upon said lateral position noise at said second frequency and upon said first amplitude;

estimating said stroke sensitivity based upon said stroke sensitivity at said first frequency and upon said stroke sensitivity at said second frequency.

6. The method of claim 2, wherein the step using said micro-actuator stimulus signal, further comprises the step:

generating said micro-actuator stimulus signal with said first amplitude sweeping through a frequency range to determine at least one vibration mode.

7. The method of claim 1, wherein the step using said micro-actuator stimulus signal, further comprises:

amplifying a first spreading signal by a first weight to create said micro-actuator stimulus signal;

wherein the step deriving said lateral position noise, further comprises the steps:

demodulating said Position Error Signal by said first spreading signal to create a PES weight; and generating a lateral position noise weight from said PES weight;

wherein the step estimating said stroke sensitivity, further comprises the step:

estimating said stroke sensitivity based upon said lateral position noise weight and upon said first weight.

8. The method of claim 7, wherein the step using said micro-actuator stimulus signal, further comprises:

amplifying a second spreading signal by a second weight to create said micro-actuator stimulus signal;

wherein the step deriving said lateral position noise, further comprises the steps:

demodulating said Position Error Signal by said second spreading signal to create a second PES weight; and generating a second lateral position noise weight from said second PES weight;

wherein the step estimating said stroke sensitivity, further comprises the steps:

estimating a second stroke sensitivity based upon said second lateral position noise weight and upon said second weight; and estimating said stroke sensitivity based upon said first stroke sensitivity and upon said second stroke sensitivity.

9. The method of claim 8, wherein the bandwidth of said first spreading signal is contained in the bandwidth of said second spreading signal.

10. The method of claim 9, wherein the step determining said operational bandwidth of said micro-actuator further comprises the steps:

determining a first distance between said lateral position noise and said first spreading signal amplified by said first weight;

determining a second distance between said second lateral position noise and said second spreading signal amplified by said second weight; and determining said operational bandwidth for said micro-actuator based upon said first distance for said bandwidth of said first spreading signal, and based upon said second distance for said bandwidth of said second spreading signal.

11. A method of claim 1, further comprising at least one of the steps:

initializing a servo-controller with said stroke sensitivity, with said servo-controller configured to drive said micro-actuator based upon said micro-actuator stimulus signal;

calibrating said servo-controller to use said stroke sensitivity;

manufacturing an embedded circuit by initializing/calibrating said servo-controller included in said embedded circuit to create said embedded circuit configured to use said stroke sensitivity; and manufacturing said hard disk drive with said stroke sensitivity, said hard disk drive including said embedded circuit, said voice coil motor, said micro-actuator, said slider, and said rotating disk surface.

12. The method of claim 11, wherein the step manufacturing said embedded circuit further comprises the steps:

installing a servo computer and a memory into said servo-controller; and programming said memory with a program system to support means for estimating said stroke sensitivity based upon said lateral position noise induced by said micro-actuator stimulus signal as said Direct Current gain of said frequency response of said Error Sensitivity Function of said voice coil motor within said operational bandwidth of said micro-actuator.

13. The method of claim 11, wherein said servo controller, includes:

means for using said micro-actuator stimulus signal driving said micro-actuator to induce noise into the lateral positioning of said read-write head near said track by the voice coil motor to create the Position Error Signal;

means for deriving said lateral position noise from said Position Error Signal; and means for estimating said stroke sensitivity based upon said lateral position noise and upon said micro-actuator stimulus signal;

wherein the step manufacturing said servo controller, comprises the steps:

installing means for using, means for deriving, and means for estimating to create said servo-controller.

14. The method of claim 11, wherein said embedded circuit configured to use said stroke sensitivity is a product of the step manufacturing said embedded circuit.

15. A The method of claim 11, wherein the step manufacturing said hard disk drive, comprises the steps:

coupling said embedded circuit to said voice coil motor, providing said micro-actuator stimulus signal to drive said micro-actuator, and a read differential signal pair from said read-write head to said servo-controller to generate said Position Error Signal, to create said hard disk drive;

using said micro-actuator stimulus signal driving said micro-actuator to induce noise into the lateral positioning of said read-write head near said track by the voice coil motor to create said Position Error Signal;

deriving said lateral position noise from said Position Error Signal; and estimating said stroke sensitivity based upon said lateral position noise as said single noise source and upon said micro-actuator stimulus signal as said Direct Current gain of said frequency response of said Error Sensitivity Function of said voice coil motor within said operational bandwidth of said micro-actuator to create said hard disk drive with said stroke sensitivity.

16. The method of claim 11, wherein said hard disk drive with said stroke sensitivity is a product of the step manufacturing said hard disk drive.

17. A servo-controller for estimating a stroke sensitivity of a micro-actuator, comprising:

a micro-actuator driver;

a micro-actuator stimulus signal;

said micro-actuator stimulus signal driving said micro-actuator driver providing a lateral control signal to said micro-actuator to induce a noise into a lateral positioning of a read-write head near a track by a voice coil motor to create a Position Error Signal;

said stroke sensitivity;

means for deriving said lateral position noise from said Position Error Signal; and means for estimating said stroke sensitivity based upon said lateral position noise induced by said micro-actuator stimulus signal as a Direct Current gain of a frequency response of an Error Sensitivity Function of said voice coil motor within an operational bandwidth of said micro-actuator coupled to a slider including said read-write head near a rotating disk surface near said track.

18. The servo-controller of claim 17, comprising: a servo computer accessibly coupled to a memory and instructed by a program system including program steps residing in said memory to control said micro-actuator stimulus signal and to estimate said stroke sensitivity;

wherein said program system, comprises the program steps:

using said micro-actuator stimulus signal driving said micro-actuator to induce noise into the lateral positioning of said read-write head near said track by the voice coil motor to create the Position Error Signal;

deriving said lateral position noise from said Position Error Signal; and estimating said stroke sensitivity based upon said lateral position noise and upon said micro-actuator stimulus signal.

19. The servo-controller of claim 18, wherein said program system, further comprises the program step:

controlling said voice coil motor to laterally position said read-write head near said track on said rotating disk surface.

20. The servo-controller of claim 17, further comprising at least one of:

means for controlling said voice coil motor to laterally position said read-write head near said track on said rotating disk surface; and means for using said micro-actuator stimulus signal driving said micro-actuator to induce said noise into said lateral positioning of said read-write head near said track by said voice coil motor to create said Position Error Signal.

21. The servo-controller of claim 20, wherein at least one member of a means group includes, at least one member of the group consisting of:

a computer accessibly coupled to a memory and instructed by a program system including at least one program step residing in said memory;

a finite state machine; and an Application Specific Integrated Circuit (ASIC);

wherein said members of said means group, consist of: said means for controlling, said means for using, said means for deriving, and said means for estimating;

wherein said computer includes at least one instruction processor and at least one data processor; and wherein each of said data processors is directed by at least one of said instruction processors as instructed by said program system.

22. The servo-controller of claim 17, means for using said micro-actuator stimulus signal, comprises:

said micro-actuator stimulus signal driving a micro-actuator driver providing a lateral control signal to said micro-actuator;

wherein said micro-actuator responds to said lateral control signal to induce said noise into said lateral positioning of said read-write head near said track by said voice coil motor.

23. The servo-controller of claim 22, wherein the said micro-actuator stimulus signal driving said micro-actuator driver, further comprises:

said micro-actuator stimulus signal feeds a digital to analog converter providing a first micro-actuator driving signal contributing to said lateral control signal.

24. The servo-controller of claim 23, wherein said micro-actuator stimulus signal drives a micro-actuator driver, further comprises:

said micro-actuator stimulus signal feed a digital to analog converter providing a first micro-actuator driving signal contributing to said lateral control signal.

25. The servo-controller of claim 24, wherein said micro-actuator stimulus signal feeding said digital to analog converter, further comprises:

said first micro-actuator driving signal is presented to a first amplifier providing a first amplified signal further contributing to said lateral control signal.

26. The servo-controller of claim 25, wherein said first amplifier providing said first amplified signal further comprising:

said first amplified signal is presented to a first filter to provide said lateral control signal.

27. The servo-controller of claim 23, wherein said micro-actuator stimulus signal drives said micro-actuator driver, further comprises:

said first micro-actuator driving signal is presented to a second filter providing a second filtered signal further contributing to said lateral control signal.

28. The servo-controller of claim 24, wherein said second filter providing said second filtered signal, further comprises:

said second filtered signal is presented to a second amplifier providing said lateral control signal.

29. An embedded circuit, comprising a servo-controller for estimating a stroke sensitivity of a micro-actuator, comprising:

a micro-actuator driver;

a micro-actuator stimulus signal;

said micro-actuator stimulus signal driving said micro-actuator driver providing a lateral control signal to said micro-actuator to induce a noise into a lateral positioning of a read-write head near a track by a voice coil motor to create a Position Error Signal;

said stroke sensitivity;

means for deriving said lateral position noise from said Position Error Signal; and means for estimating said stroke sensitivity based upon said lateral position noise induced by said micro-actuator stimulus signal as a Direct Current gain of a frequency response of an Error Sensitivity Function of said voice coil motor within an operational bandwidth of said micro-actuator coupled to a slider including said read-write head near a rotating disk surface near said track.

30. A hard disk drive, comprising:

a disk base;

a spindle motor mounted on said disk base and coupled to at least one disk to create a rotating disk surface;

a voice coil motor mounted on said disk base to pivot a micro-actuator coupled to a slider to position a read-write head at a lateral position near a track on said rotating disk surface, with said voice coil motor providing a micro-actuator stimulus signal said micro-actuator actuator to alter said lateral position;

an embedded circuit coupled to said voice coil motor to provide said lateral control signal to drive said micro-actuator and receiving a Position Error Signal based upon a read signal differential signal pair from said read-write head, said embedded circuit comprising a servo-controller, comprising
- a micro-actuator stimulus signal;
- a micro-actuator driver driven by said micro-actuator signal to create said lateral control signal;
- a stoke sensitivity of said lateral position of said read-write head based upon said micro-actuator stimulus signal;
- means for estimating said stroke sensitivity of said micro-actuator based upon a lateral position noise induced by said micro-actuator stimulus signal into said lateral position of said read-write head near said track by said voice coil motor, further comprising means for deriving said lateral position noise from said Position Error Signal; and means for estimating said stroke sensitivity based upon said lateral position noise induced by said micro-actuator stimulus signal as a Direct Current gain of a frequency response of an Error Sensitivity Function of said voice coil motor within an operational bandwidth of said micro-actuator.

* * * * *